United States Patent [19]
Sakata et al.

[11] Patent Number: 5,920,447
[45] Date of Patent: Jul. 6, 1999

[54] MAGNETIC DISK UNIT HAVING LAMINATED MAGNETIC HEADS

[75] Inventors: Hiromi Sakata; Hiroaki Yoda, both of Kawasaki; Tomomi Funayama, Fujisawa; Kohichi Tateyama, Ichikawa; Tadahiko Kobayashi, Yokohama; Shigeru Takekado, Tokyo-to; Yoichiro Tanaka, Kawasaki, all of Japan

[73] Assignee: Kabushiki Kaisha Toshiba, Kawasaki, Japan

[21] Appl. No.: 08/818,674

[22] Filed: Mar. 14, 1997

[30] Foreign Application Priority Data

Mar. 14, 1996 [JP] Japan .................................. 8-058013

[51] Int. Cl.⁶ ...................................................... G11B 5/29
[52] U.S. Cl. ................................................................ 360/121
[58] Field of Search ..................................... 360/121, 126

[56] References Cited

U.S. PATENT DOCUMENTS

| | | | |
|---|---|---|---|
| 4,012,781 | 3/1977 | Lin .......................................... | 360/113 |
| 4,549,232 | 10/1985 | Axmear et al. ........................... | 360/77 |
| 5,010,430 | 4/1991 | Yamada ................................... | 360/103 |
| 5,016,342 | 5/1991 | Pisharody ................................ | 360/121 |
| 5,452,165 | 9/1995 | Chen ....................................... | 360/121 |

FOREIGN PATENT DOCUMENTS

| | | |
|---|---|---|
| 61-120314 | 7/1986 | Japan . |
| 4-206012 | 7/1992 | Japan . |
| 8-138215 | 5/1996 | Japan . |

*Primary Examiner*—A. J. Heinz
*Attorney, Agent, or Firm*—Foley & Lardner

[57] ABSTRACT

A magnetic multi-head unit includes: a specific magnetic head formed so that a pair of magnetic yokes face each other on the same plane via a magnetic gap inclined by a predetermined azimuth angle; and a magnetic head which is adjacent to the specific magnetic head and which is formed so that a pair of magnetic yokes face each other on a plane different from the plane of the specific magnetic head via a magnetic gap inclined by the azimuth angle. The specific magnetic head and the adjacent magnetic head are laminated so as to form a plurality of layers while being shifted from each other in directions in which tracks on a magnetic disk extend. A magnetic disk unit includes: a magnetic disk, on which a plurality of information recording tracks are formed so as to extend in peripheral directions and which is rotated; and a magnetic multi-head including a plurality of transducers as heads for simultaneously writing and/or reading magnetic information on the plurality of information recording tracks of the magnetic disk every predetermined group of the tracks. The plurality of transducers are positioned as one with respect to the predetermined group of the tracks.

13 Claims, 21 Drawing Sheets

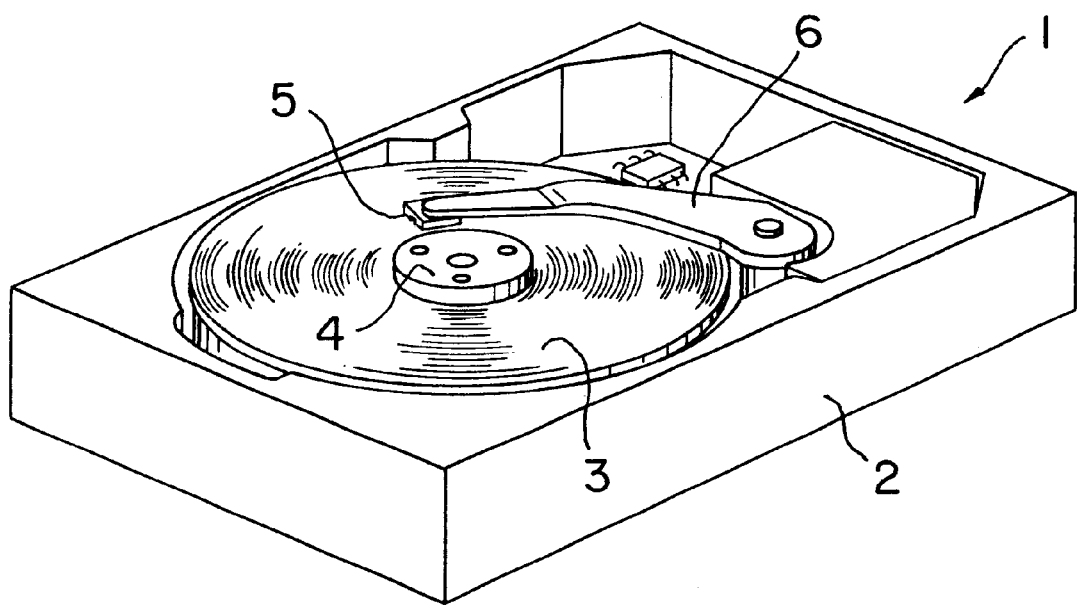
F I G. 3
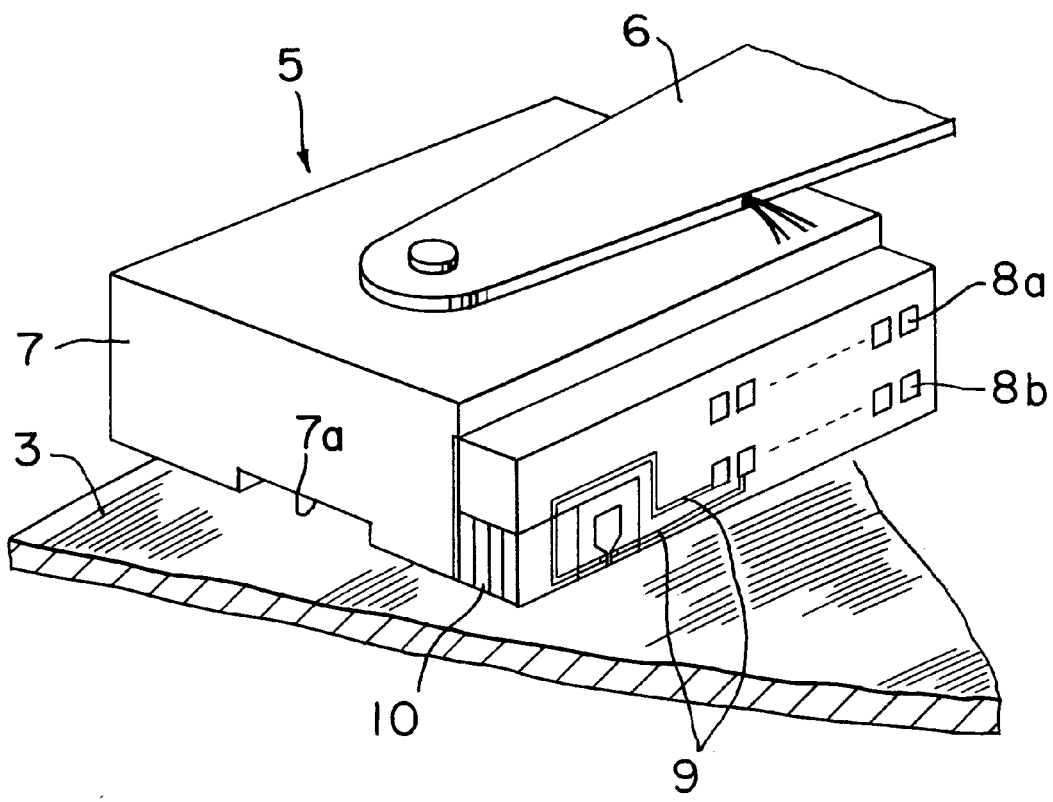
F I G. 4

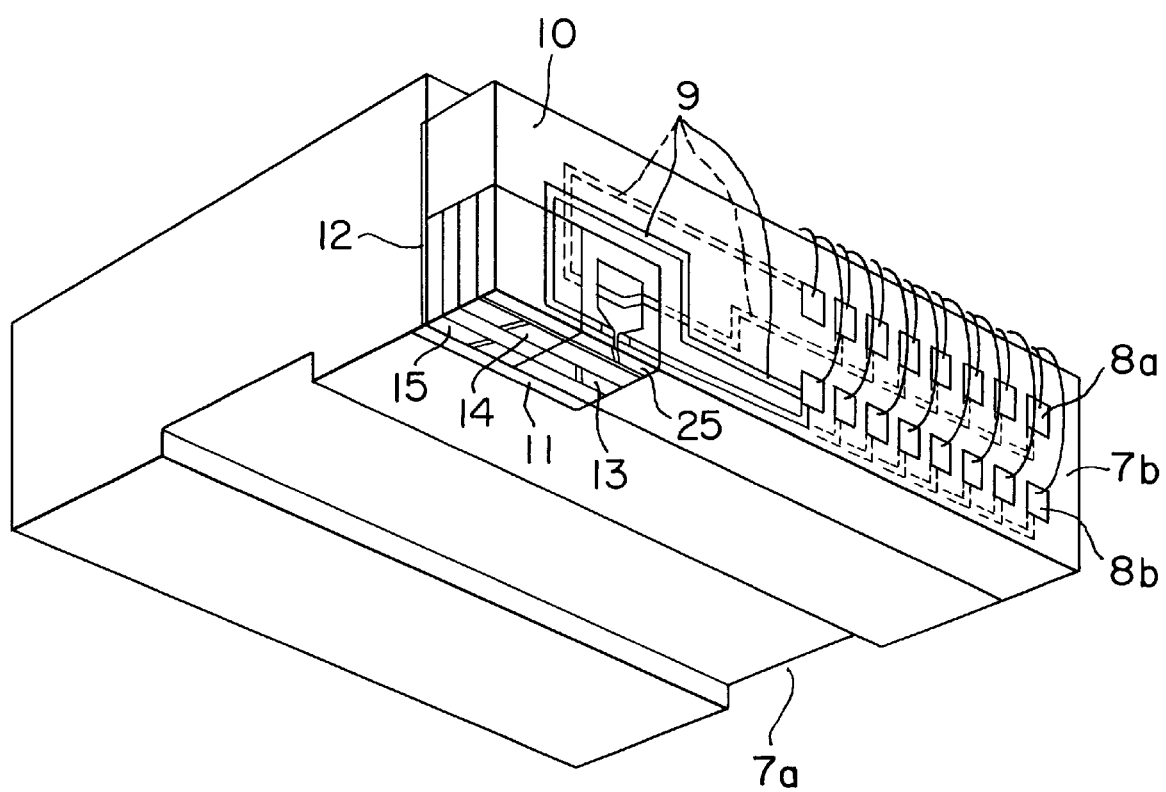
F I G. 5

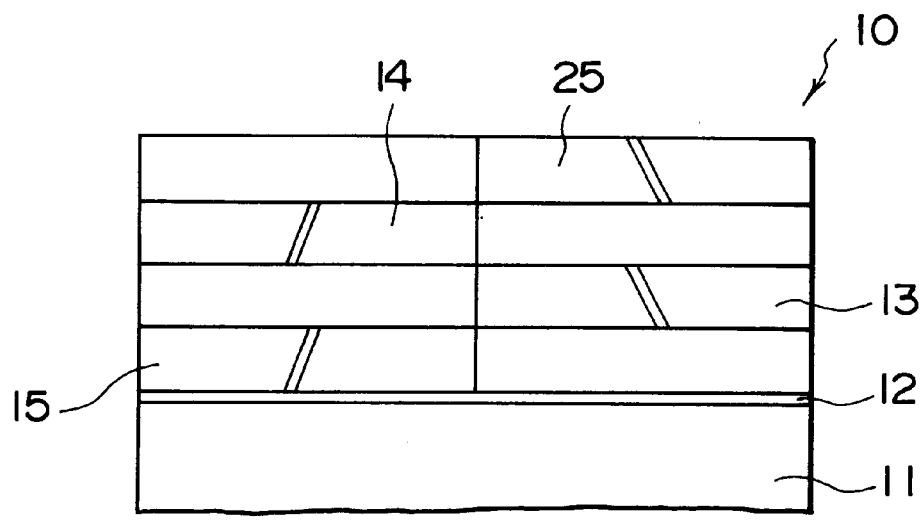
F I G. 9 A
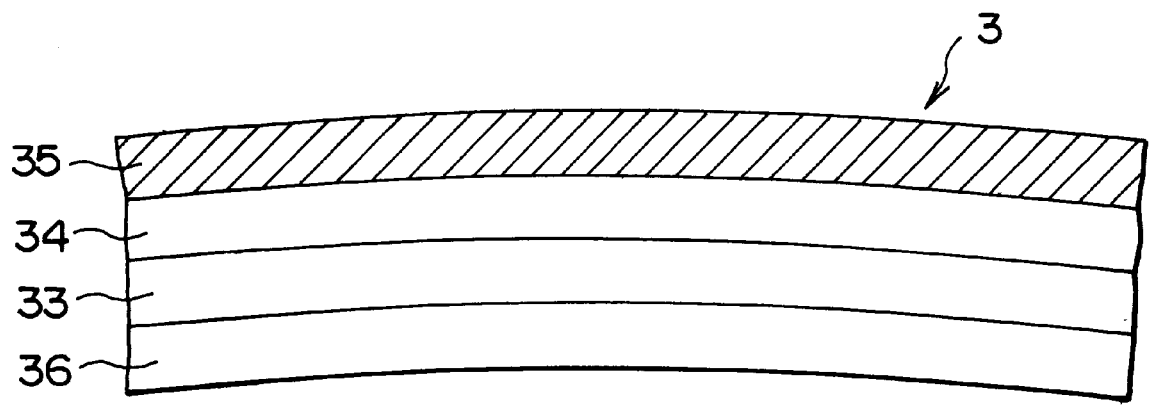
F I G. 9 B

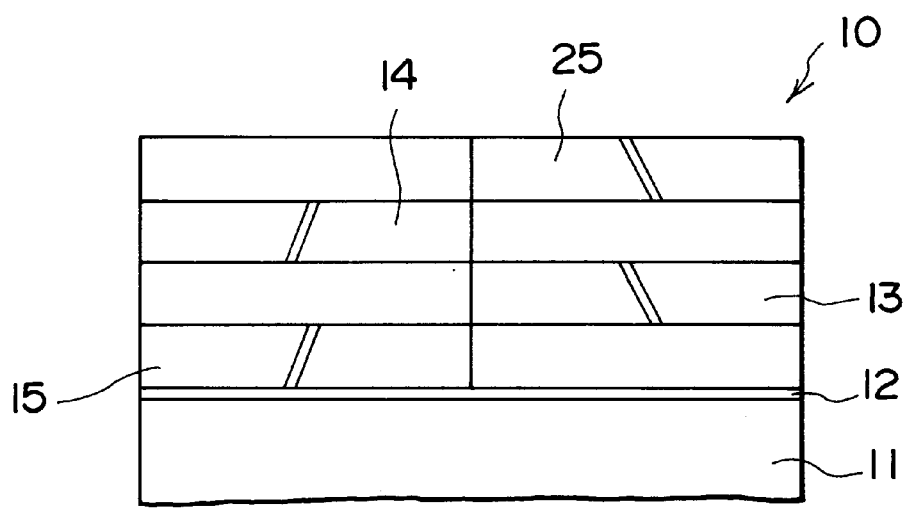
F I G. 10A
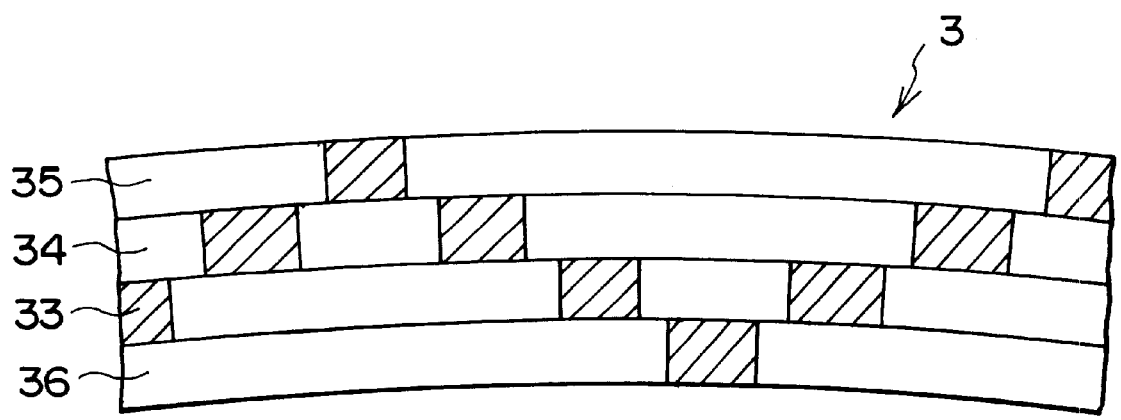
F I G. 10B

MAGNETIC DISK UNIT HAVING LAMINATED MAGNETIC HEADS

BACKGROUND OF THE INVENTION

The present invention relates generally to a magnetic disk unit using a disk type recording medium (which will be hereinafter referred to as a "magnetic disk") such as a hard disk. More specifically, the invention relates to a magnetic disk unit which can greatly improve the positioning accuracy and speed between a magnetic head and an information recording track by recording positioning signals over the whole periphery of the magnetic disk.

In particular, the present invention relates to a small magnetic disk unit wherein a servo surface is the same as a data surface. In addition, the invention is applied to a magnetic disk unit having a multi-head system which can read information by means of a plurality of magnetic heads in accordance with the increased density of a magnetic disk.

In recent years, with the improvement of the performance of information apparatus such as a computer, it has been required to increase the recording density of a magnetic disk and the transfer rate for reading by means of a magnetic head in a magnetic disk unit. In order to satisfy such a request, the performances of recording disks and recording and/or reproducing heads have been energetically improved, so that the recording capacity of a disk has been greatly increased.

In conventional magnetic disk units, a single recording and/or reproducing head is arranged so as to face an information recording surface of a magnetic recording medium. This recording and/or reproducing head gains access to a desired track of the information recording surface of the magnetic recording medium by rotating a supporting arm having the recording and/or reproducing head at the tip thereof, so that servo signals recorded at several positions per track are reproduced by means of the recording and/or reproducing head. Thus, the information signal is reproduced while carrying out the fine positioning.

Although the recording capacities of magnetic disks mounted in magnetic disk units have been greatly increased, such constructions and operations have not basically been improved, so that the positioning between the magnetic head and the magnetic disk is carried out in the same manner as the conventional manner.

In a magnetic disk unit having a high-density magnetic disk, with the increase of the density of tracks formed on the information recording surface, the number of tracks increases and the width of the information recording track decreases. When the width of the information recording track decreases, there are problems in that it is required to accurately carry out the positioning of the magnetic head and track, and that the access speed of the magnetic head decreases due to the increased number of tracks.

In addition, in conventional magnetic disk units, information is recorded on a plurality of tracks provided on concentric circles, and read out of the tracks, by means of a magnetic head which is positioned at a radial position on a magnetic disk by rotating the magnetic disk. In order to position the magnetic head, the sector servo method, wherein servo information is discretely written on a part of the recording circle of a track, is utilized in a small disk such as 3.5-inch and 2.5-inch disks for a hard disk drive (HDD). This servo information comprises various informations. In the sector servo method, there is provided a discrete positioning servo system for deriving a positioning error of a magnetic head from the informations to control the magnetic head so that the positioning error is zero.

FIG. 1 shows an example of a position information of the servo information written on a disk. In FIG. 1, one track comprises a plurality of servo sectors. The servo information is written on the front portion of each of the servo sectors, so that it is possible to obtain a positional error signal on the basis of the servo information. Next to the servo information, a data information is written on each track. A transducer having a narrower width than that of the track is mounted on a magnetic head. The positioning of the transducer is carried out by causing a positional error information to feedback to a servo system every track. Four burst servo patterns of A, B, C and D are written as the servo information,. The tracks are expressed by six tracks of (n−2), (n−1), n, (n+1), (n+2) and (n+3). The transducer mounted on the magnetic head is positioned at track n.

Out of the four servo patterns of A, B, C and D, the positions of the servo patterns A and B (or C and D) are shifted from each other by one track, and the positions of the servo patterns A and C (or B and D) are shifted from each other by a half track. By deriving the difference between the positional signals obtained by the servo patterns A and B, it is possible to obtain a positional signal having a good linearity in the range of from −½ to +½. The servo patterns C and D are used for obtaining the positional informations of tracks between −1 and −½ and between +½ and +1.

In conventional magnetic disk units, a magnetic head is positioned at each track, and a serial data is read and written by means of the magnetic head. For that reason, there is a problem in that it is difficult to increase the transfer rate of data. In addition, the servo information read out by the transducer is used. Therefore, when the density of track increases, the width of track decreases and the read signal for the servo information decreases. As a result, there is a problem in that the signal-to-noise ratio increases to lower the positioning accuracy.

In the aforementioned conventional magnetic disk units, there are problems in that it is difficult to gain the track access with sufficient accuracy and speed as the increased track density of the magnetic disk and the increased information recording capacity, and that it is not possible to sufficiently increase the transfer rate of data in an information processing apparatus or the like using this magnetic disk unit due to the limits of recording and/or reproducing speed.

In a hard disk drive as an example of conventional magnetic disk units, a plurality of magnetic disks, each of which has a magnetic layer on a non-magnetic substrate, are laminated around a single rotational axis. A recording and/or reproducing head is mounted on an arm to face each of the magnetic disks. The arm is moved by means of an actuator to carry out the positioning of the head. When the hard disk drive carries out the recording and/or reproducing of information, the head does not directly contact the surface of the magnetic disk which rotates at a high speed, but it is designed to gain access a desired position on the surface of the magnetic disk while being slightly upwards apart from the surface of the magnetic disk. Thus, the head is designed to record or reproduce signals on tracks of concentric circles on the surface of the magnetic disk.

In order to increase the storage capacity in the aforementioned hard disk drive, an attempt to improve the linear density of a disk, i.e., the packing density in a longitudinal direction of a track, and an attempt to improve the packing density by decreasing the width of a track to increase the track density, have been made. In recent years, an active head, such as a MR head, using the magneto-resistance effect of a high read sensitivity has been actively developed, so that a great read signal can be obtained from a narrow track. The MR head is designed to convert a magnetic flux from a recording medium into an electric signal, using the characteristic that the electric resistance of a soft magnetic substance such as permalloy is varied by an external magnetic field. Since the read sensitivity of the MR head is proportional to a sense current flowing through the soft magnetic substance for converting a resistance variation into a voltage variation, it is possible to obtain a great output even if the relative speed of the head to the medium is small.

On the other hand, even if the MR head of a high sensitivity is used, the distribution of read sensitivities in a lateral direction of track has the shape of, not rectangle, triangle or trapezoid which has dull ends at the skirt portions thereof. Therefore, there is a problem in that a signal is reproduced from the adjacent recording track due to the skirt portions of sensitivity, i.e., the cross talk occurs.

SUMMARY OF THE INVENTION

It is therefore an object of the present invention to eliminate the aforementioned problems and to provide a magnetic disk unit, wherein a magnetic head can accurately gain access to a track formed on an information recording surface of a magnetic recording medium, and which can sufficiently respond to the increased data transfer speed in an information processing apparatus to carry out the recording and/or reproducing with a high speed.

It is another object of the present invention to provide a magnetic disk unit, which can increase the transfer rate if a magnetic multi-head unit is used, and which can prevent the positioning accuracy from lowering if the track density increases.

It is further object of the present invention to provide a magnetic disk unit, which can decrease the cross talk, wherein a signal is reproduced from the adjacent recording track, if a magnetic multi-head unit is used, and which can maintain the effective width of a reproducing head to prevent the quality of a signal from deteriorating.

In order to accomplish the aforementioned and other objects, according to a first aspect of the present invention, a magnetic multi-head unit comprises: a specific magnetic head formed so that a pair of magnetic yokes face each other on the same plane via a magnetic gap inclined by an azimuth angle; and a magnetic head, adjacent to the specific magnetic head, formed so that a pair of magnetic yokes face each other on a plane different from the plane of the specific magnetic head via a magnetic gap inclined by the same azimuth angle as the azimuth angle, wherein the specific magnetic head and the adjacent magnetic head are laminated so as to form a plurality of layers while being shifted from each other in directions in which tracks on a magnetic disk extend.

According to a second aspect of the present invention, a magnetic disk unit comprises: a magnetic disk including positioning-signal recording tracks wherein positioning signals are recorded on any two tracks out of tracks of each group which includes a plurality of tracks formed as concentric circulars on at least one surface of the disk, and information recording tracks which are formed by tracks of the remaining groups for recording information signals; and a magnetic multi-head unit including a plurality of information-signal recording and/or reproducing heads, the number of which is the same as that of the information recording tracks and which are arranged at locations corresponding to the information recording tracks, and positioning-signal reading heads which are arranged at locations corresponding to the two positioning-signal recording tracks, wherein two heads of the plurality of heads, which are adjacent to each other in lateral directions of the tracks, are shifted in directions in which the tracks extend, and wherein azimuth angles of the adjacent two heads are different from each other.

According to a third aspect of the present invention, a magnetic disk unit comprises: a magnetic disk, on which a plurality of information recording tracks are formed so as to extend in peripheral directions and which is rotated; and a magnetic head including a plurality of transducers for simultaneously writing and/or reading magnetic information on the plurality of information recording tracks of the magnetic disk every a predetermined group of the tracks; wherein the plurality of transducers are positioned as one with respect to the predetermined group of the tracks.

According to a fourth aspect of the present invention, a magnetic disk unit comprises: a magnetic disk on which signals are magnetically recorded on tracks formed so as to extend in peripheral directions; a magnetic head, which includes a recording head for recording a signal on the magnetic disk, and a reproducing head for reproducing a magnetic signal from the magnetic disk; the reproducing head comprising a group of three reproducing elements or more for simultaneously reproducing signals of at least three recording tracks which are adjacent to each other; head selecting means for selecting a data reproducing element, which reproduces and decodes a recorded information, and a pair of cross-talk compensation reproducing elements adjacent to the data reproducing element, from the group of reproducing elements; a delay element for delaying a read signal to compensate a time difference between the data reproducing element and the cross-talk reproducing element; and cross-talk compensating means for subtracting a cross talk signal reproduced by means of the adjacent cross-talk compensation reproducing elements, from a signal reproduced by means of the selected data reproducing element.

With the aforementioned constructions, in a magnetic disk unit of the present invention, a plurality of heads have different azimuth angles and are adjacent to each other. Therefore, even if an error occurs in the tracking, the signal from the adjacent track attenuates due to the difference of azimuth angles to decrease the cross talk, so that it is possible to set a small guard band between the tracks. In addition, since the positioning servo signals are recorded on the whole periphery of the track on the recording medium, it is possible to always compensate the position shift by reproducing the positioning servo signals by means of an exclusive head.

Thus, it is possible to quickly and accurately carry out the tracking and to accurately gain access to a track, so that it is possible to greatly contribute to the increase of density of a magnetic disk.

In addition, it is possible to decrease the recording fringe by forming an azimuth angle of the outermost head so that the angle between a magnetic yoke on the side of a trailing edge and the surface of a gap is an obtuse angle, i.e., the outside angle is an acute angle.

Moreover, according to the present invention, it is possible to read signals out of a plurality of tracks by a single tracking action. Therefore, it is possible to greatly improve the access speed, in comparison with conventional units wherein it is required to carry out the mechanical tracking action even if one track is shifted.

In addition, according to the present invention, it is possible to provide a magnetic disk unit which does not lower the positioning accuracy with respect to a track, if a magnetic multi-head unit is used to increase the data transfer rate and if a high-density track corresponding thereto is used.

Moreover, according to the present invention, even if a reproducing head, which has a broad distribution of sensitivities in cross track directions and which has a great cross talk from the adjacent track, is used, it is possible to provide a magnetic disk unit, which can use a high-density track, which has a small deterioration of data quality due to the cross talk and so forth, and which has high reliability of data.

BRIEF DESCRIPTION OF THE DRAWINGS

In the drawings:

FIG. 3 is a perspective view illustrating the whole construction of a magnetic disk unit according to the present invention;

FIG. 4 is a perspective view illustrating a slider and a magnetic head portion of a magnetic head unit in a magnetic disk unit according to the present invention;

FIG. 5 is a perspective view illustrating the slider and the magnetic head portion of the magnetic disk unit according to the present invention, which is viewed from the bottom;

FIGS. 7A and 76 are views explaining the track width on the side of a head and the servo-signal writing state on the side of a magnetic disk in the first preferred embodiment of a magnetic disk unit according to the present invention;

FIGS. 9A and 9B are views explaining the track width on the side of a head and the servo-signal writing state on the side of a magnetic disk in the third preferred embodiment of a magnetic disk unit according to the present invention;

FIGS. 10A and 1OB are views explaining the track width on the side of a head and the servo-signal writing state on the side of a magnetic disk in the fourth preferred embodiment of a magnetic disk unit according to the present invention;

DESCRIPTION OF THE PREFERRED EMBODIMENTS

Figure 1:
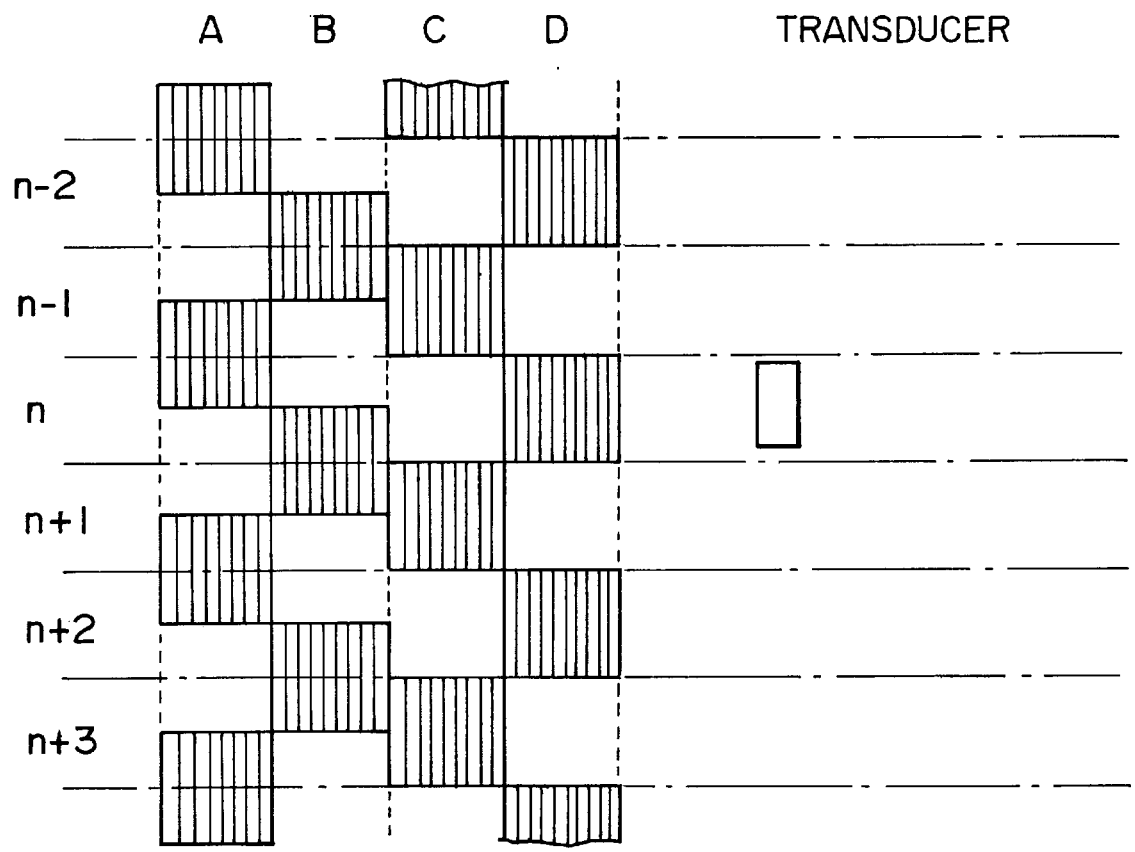
FIG. 1 is a view illustrating an example of a positional information of a conventional servo signal.

Referring now to the accompanying drawings, the preferred embodiments of a magnetic disk unit according to the present invention will be described in detail below.

First, referring to FIGS. 2 through 7, the first preferred embodiment of a magnetic disk unit according to the present invention will be described. FIG. 3 shows the whole construction of a magnetic disk unit 1. As shown in FIG. 3, the magnetic disk unit 1 generally comprises: a housing 2 for housing therein all the elements of the unit 1; a plurality of thin-film magnetic disks 3 which are laminated and which are rotatably housed in the housing 2; a stepping motor 4 for rotatably driving the magnetic disks 3; a head unit 5 facing the information recording surfaces of the magnetic disks 3 for recording information on the disks 3 and for reading the information out of the disks 3; and a supporting arm 6 which has a tip portion for supporting the head unit 5 and a base portion rotatably mounted on the bottom of the housing 2.

Referring to FIG. 4, the detailed constructions of the magnetic disk 3 and the head unit 5 will be described. The head unit 5 comprises: a slider 7 suspended from the supporting arm 6 so as to be supported thereon; a writing head pad 8a mounted on one side of the slider 7 for supplying a write signal; a reading head pad 8b for supplying a read signal; and a magnetic head portion 10 for receiving the signals from the writing head pad 8a and the reading head pad 8b via leads 9 to produce a magnetic field to write information on the information recording surface of the disk 3 and to read the information out of the information recording surface.

The slider 7 is formed with an afloat-amount adjusting groove 7a on the side of the bottom facing the information recording surface of the disk 3. The afloat-amount adjusting groove 7a is provided for adjusting the wind pressure produced by the rotation of the disk 3 to adjust the afloat amount of the slider 7. The magnetic head portion 10 also has a plurality of reading heads, writing heads, positioning-signal reading heads and so forth, on the side of the bottom facing the information recording surface of the disk 3.

FIG. 5 shows the slider 7 and the magnetic head portion 10 viewed from the bottom thereof. The pads 8a and 8b and the magnetic head portion 10 are mounted on one side 7b of the slider 7. In this first preferred embodiment, the magnetic head portion 10 comprises a plurality of heads laminated in a direction for forming an information recording track (which will be described in detail later) of the disk 3.

As shown in FIG. 5, the magnetic head portion 10 comprises a substrate 11 of, e.g., alumina ($Al_2O_3$) or titanium carbon (TiC), an insulating film 12 formed on the substrate 11, a positioning-signal reading head 15 formed on the insulating film 12, information-signal writing heads 13 and 14 formed on the upper surface of the head 15, and a positioning-signal reading head 25 formed on the outermost of the magnetic head portion 10.

Figure 2:
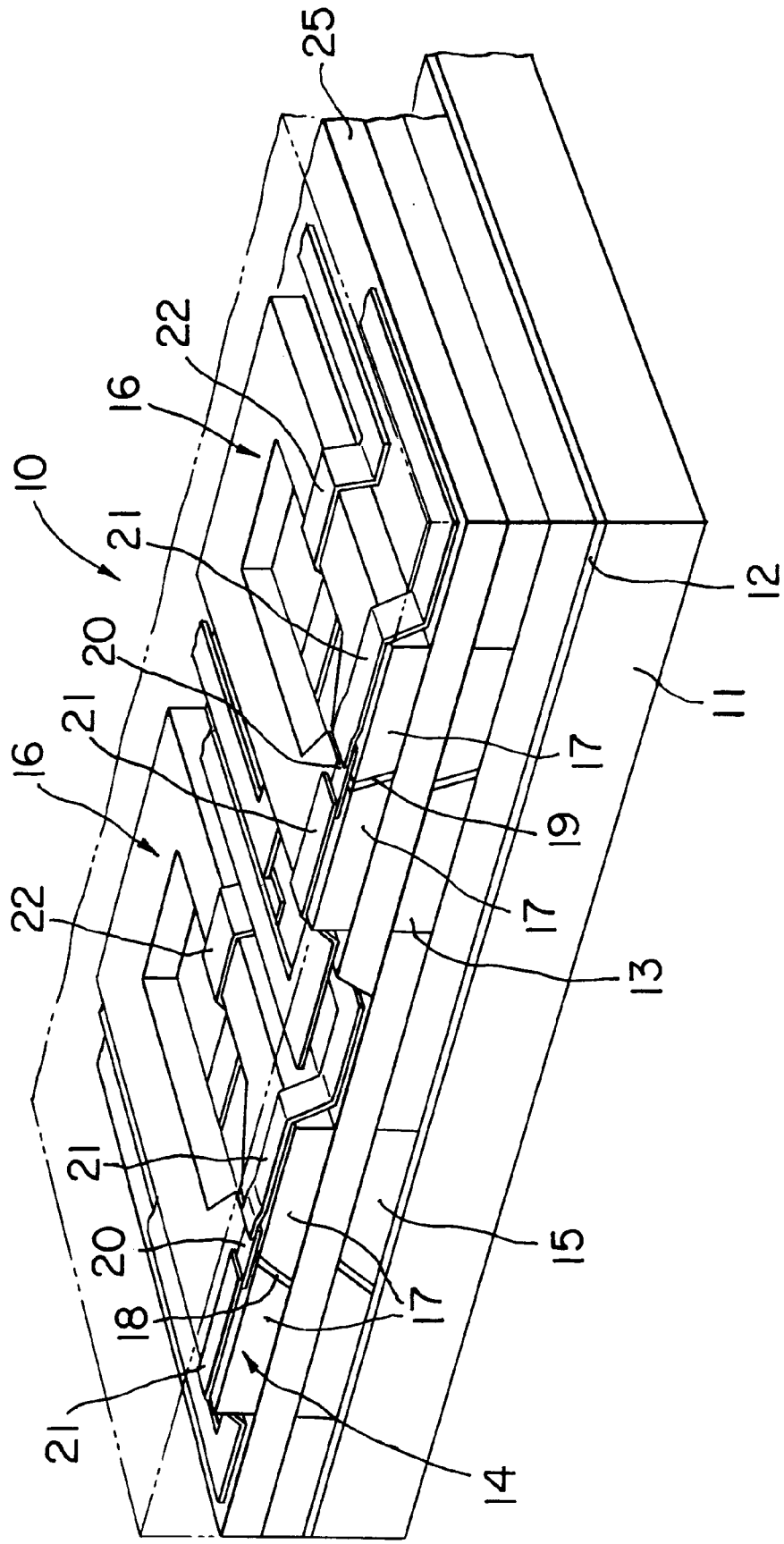
FIG. 2 is a perspective view illustrating a detailed structure of a magnetic head portion in the first preferred embodiment of a magnetic disk unit according to the present invention.

Referring to FIG. 2, the more detailed construction of the magnetic head portion 10 will be described. As shown in FIG. 2, the magnetic head portion 10 comprises a substrate 11 of $Al_2O_3$, TiC or the like, an insulating layer 12 of $Al_2O_3$ or the like formed on the upper surface of the substrate 11, and positioning-signal reading heads and information-signal writing heads 13, 14, 15 and 25 sequentially laminated so as to be formed on the upper surface of the insulating layer 12. Each of the heads will be described as examples of the outermost information-signal writing and/or reading head 14 and the positioning-signal reading head 25.

As shown in FIG. 2, each of the heads comprises: a substantially O-shaped magnetic substance 16, which is arranged substantially parallel to the substrate 11 and which is made of a soft magnetic material such as an alloy containing nickel (Ni) and iron (Fe) and an amorphous alloy containing cobalt (Co), zirconium (Zr) and niobium (Nb); a pair of magnetic yokes 17, each being formed by patterning a part of the magnetic substance 16 out of one side of the magnetic substance 16 to form a slit-like pattern so that azimuth angles of different inclined angles are formed for each of the adjacent heads; and a magnetic gap 18 or 19 of alumina ($Al_2O_3$) charged in the slit-like cut-out.

On the surface substantially parallel to the magnetic flux passing through the magnetic yoke 17, i.e., a magnetic circuit of the magnetic yoke 17, a magneto-resistance film (hereinafter referred to as a "MR film") 20 having the magneto-resistance effect for varying the specific resistance under the influence of a magnetic field, which includes a film having an anisotropic magneto-resistance effect such as a NiFe film, a spin valve film such as a CoFe/Cu/CoFe laminated film, and an artificial lattice film having a giant magneto-resistance effect, is arranged at a location recessed from the surface facing the magnetic disk 3.

That is, the MR film 20 is arranged on the surface corresponding to the surface of the laminated film of the magnetic substance 16 forming the pair of magnetic yoke 17 so that it can extend over the magnetic gap 18 to magnetically connect both of the magnetic yokes 17. The longitudinal direction of the MR film 20 is substantially parallel to the signal magnetic field caused by the magnetic circuit of the magnetic yokes 17.

A pair of leads 21 of copper (Cu) or the like connected to both ends of the MR film 20 are formed on the upper portion of the MR film 20. The pair of leads 21 are arranged so that a sense current flows in a longitudinal direction of the MR film 20 which is substantially parallel to the magnetic circuit of the magnetic yokes 17.

Furthermore, an insulating film (not shown) is arranged between the pair of magnetic yokes 17 and the MR film 20, so that the MR film 20 is insulated from the magnetic yokes 17. Each of the magnetic yokes 17 also has a recording lead 22 which is formed so as to extend from the upper side of one frame to the lower side of the other frame.

After the head 14 of the magnetic yokes 17 is formed, an insulating material of $Al_2O_3$ or the like is embedded around the head 14, and the surface thereof is formed as a flat surface so as to have the same height as the upper surfaces of the magnetic yokes 17. The head 25 serving as the upper layer thereof is formed in the same step as the aforementioned forming step. Furthermore, in this head 25, the azimuth angle of the magnetic gap 18 is inclined in a different direction from that of the magnetic gap 18 as mentioned above.

Thus, it is possible to sequentially form a plurality of heads, each having a magnetic gap which has substantially the same structure as that of the adjacent head and which has a different inclined angle for the azimuth angle from that of the adjacent head. Therefore, it is possible to provide a plurality of heads having the same track width and the same track pitch. It is also possible to accurately and completely control the track pitch by adjusting the thickness of the insulating substance, such as $Al_2O_3$, which forms the flat surface surrounding the magnetic yoke.

Figure 6A:
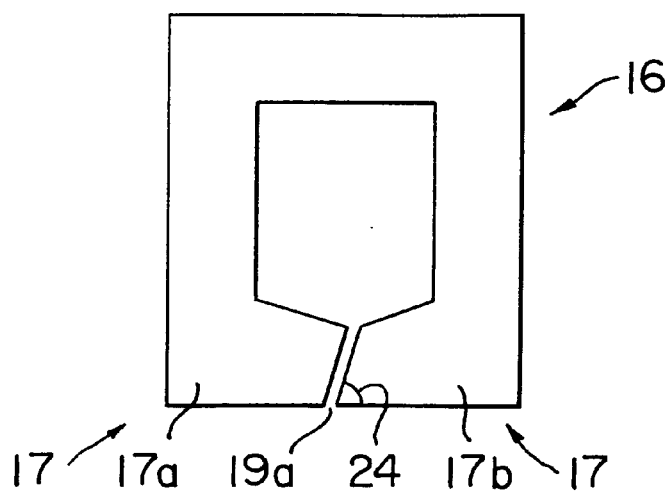
FIGS. 6A, 6B and 6C are plan, bottom and perspective views illustrating a magnetic yoke and a magnetic gap in the first preferred embodiment of a magnetic disk unit according to the present invention, respectively.
Figure 6B:
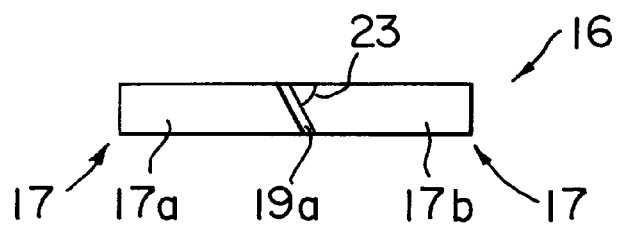
Figure 6C:
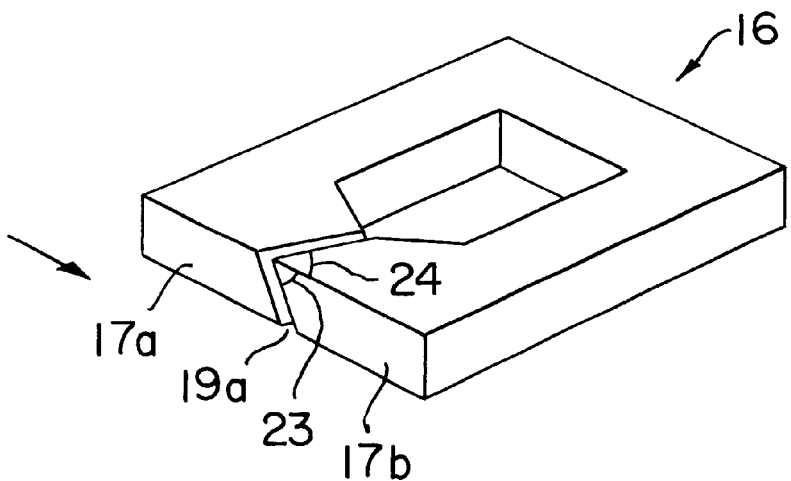

Referring to FIGS. 6A through 6C, a slit 19a of the magnetic substance 16, in which the magnetic gap 19 is charged, will be described. The slit 19a is formed in the positioning-signal reading head 25 arranged at the outermost. The inclined angle 23 for the azimuth angle of the magnetic yoke 17b on the side of the trailing edge is formed so as to be an acute angle, in comparison with the magnetic yoke 17a on the side of the leading edge. In addition, the inclined angle 24 of the magnetic yoke 17b on the plan view (see FIG. 6A) is also formed so as to be an acute angle. FIG. 6B is a bottom view of the magnetic yoke 17 viewed from the side of the information recording medium 3. It can be seen from FIG. 6B that the azimuth angle 23 is formed so as to be an acute angle. FIG. 6C is a perspective view prepared from the plan view and the bottom view.

Figure 7A:
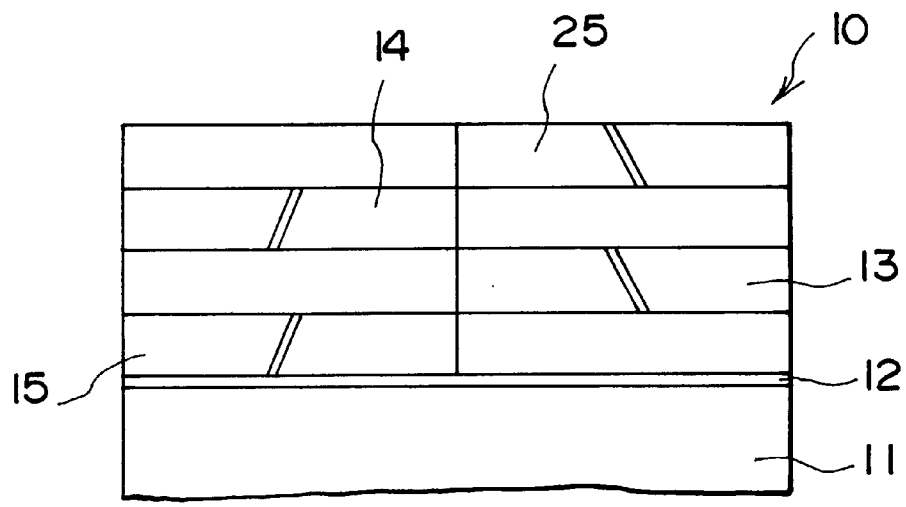
Figure 7B:
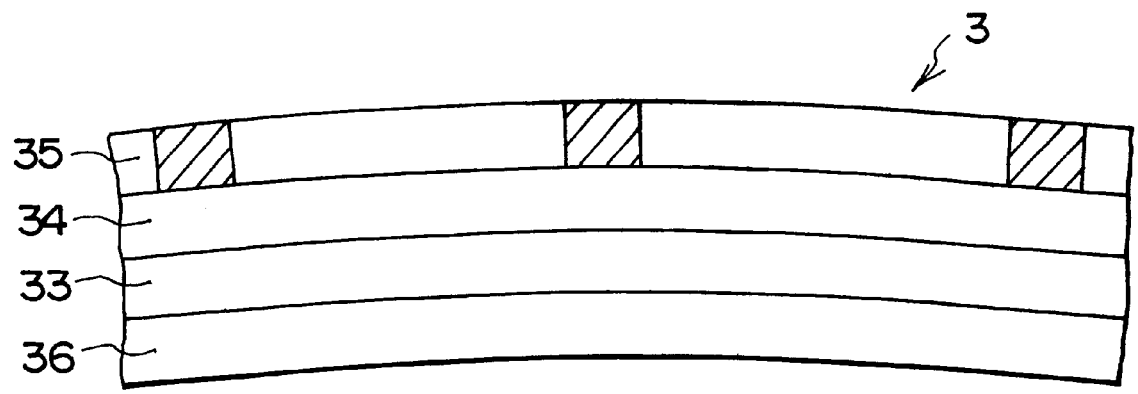

Referring to FIGS. 7A and 7B, the relationship between the pitch of each of the heads and the track pitch on the magnetic disk in the first preferred embodiment of a magnetic disk unit, according to the present invention, will be described below.

As shown in FIG. 7A, the respective heads 13, 14, 15 and 25 and the respective tracks 33, 34, 35 and 36 are formed on the facing surfaces of the magnetic head portion 10 and the magnetic disk 3, respectively, so that the respective heads correspond to the respective tracks.

In a case where the write and read of signals are carried out with respect to these four tracks using these four magnetic heads, only one head of the four heads may read the signal for carrying out the servo of the magnetic head. Therefore, if the servo signal is designed to be written on only the track 35, it is possible to carry out the tracking without causing trouble, and it is possible to increase the amount of information which can be recorded on the tracks since the servo information is not written on the other three tracks 33, 34 and 36.

The write of the servo signal on the track should not be limited to the aforementioned first preferred embodiment of the present invention, but various servo-information writing patterns in the second through fourth preferred embodiments of a magnetic disk unit according to the present invention, which are shown in FIGS. 8 through 10, may be used.

Figure 8A:
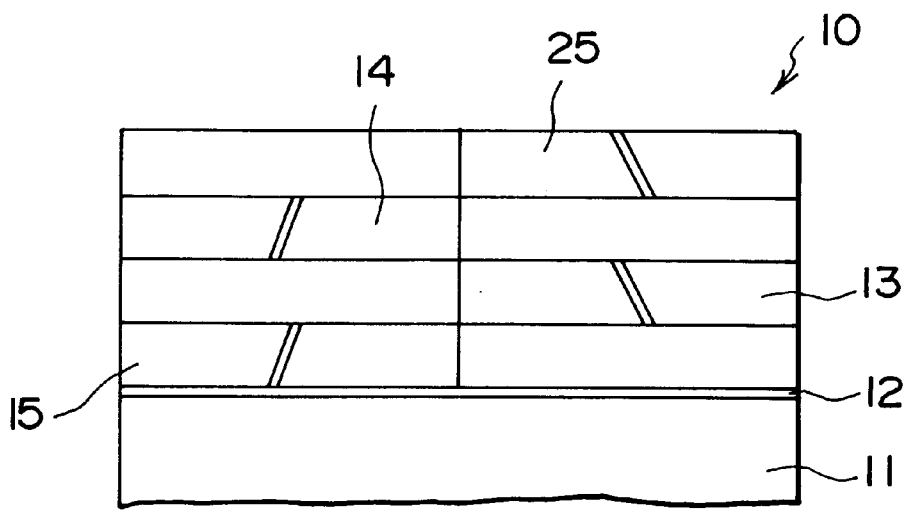
FIGS. 8A and 8B are views explaining the track width on the side of a head and the servo-signal writing state on the side of a magnetic disk in the second preferred embodiment of a magnetic disk unit according to the present invention.
Figure 8B:
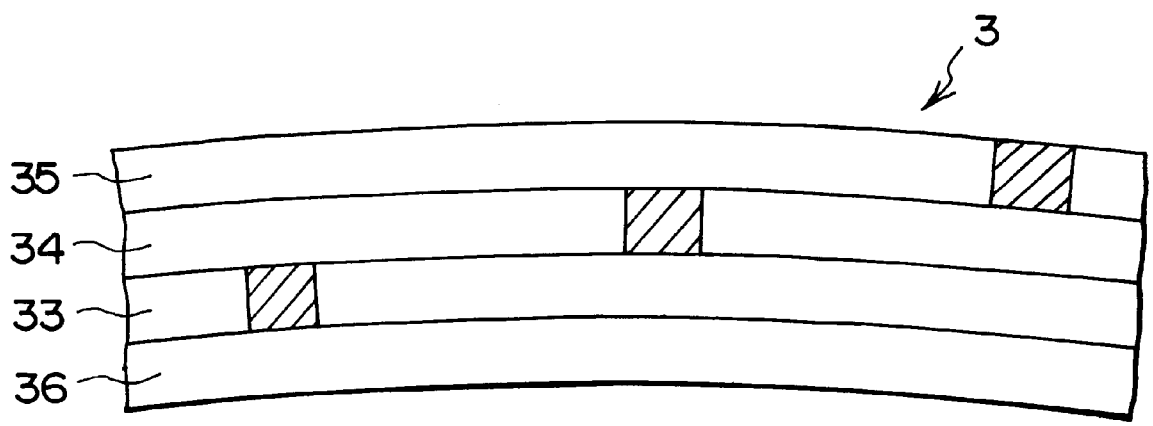

In the second preferred embodiment of a magnetic disk unit according to the present invention which is shown in FIGS. 8A and 8B, the servo information is written on a plurality of tracks, to which the heads gain access simultaneously. As shown in FIG. 8B, the servo signals are formed on the three tracks 33, 34 and 35 so as to be shifted from the signal on the adjacent track by a predetermined distance, and the servo action is carried out when the corresponding head reads a servo signal.

While the servo signals have been read at regular intervals in the aforementioned first and second preferred embodiments, the present invention should not be limited thereto, but the servo signals may be written on the whole periphery of one track 35 as the third preferred embodiment of a magnetic disk unit according to the present invention shown in FIGS. 9A and 9B. With this construction, the servo signals are always and continuously read out. FIG. 9A shows four writing heads, and FIG. 9B shows four tracks of a magnetic disk corresponding to the writing heads. In the information recording track in the third preferred embodiment, the servo signals are continuously written on only one track 35 out of the four tracks 33, 34, 35 and 36, and the servo signals are always reproduced from the writing and/or reading head 15 corresponding to the track 35.

In the aforementioned preferred embodiments, the servo signals have been written on one track out of a group of tracks, the number of which is the same as the laminated number of the head. However, the present invention should not be limited thereto, but the servo signals may be written on a plurality of tracks so that the signals for carrying out the servo action are not simultaneously detected by a plurality of heads.

FIGS. 10A and 10B show the fourth preferred embodiment of a magnetic head unit according to the present invention, wherein servo signals are written on a plurality of tracks, to which the head gains access simultaneously. As shown in FIGS. 10A and 10B, in the fourth preferred embodiment of a magnetic disk unit according to the present invention, the servo signals are written on three tracks 33, 34 and 35, which correspond to three heads 13, 14 and 15, respectively, so as to be shifted from the servo signal on the adjacent track by a predetermined distance.

Referring to FIGS. 11 through 17, the relationships between a plurality of magnetic heads and servo signals written on a plurality of tracks corresponding to the magnetic heads in various preferred embodiments of the present invention will be described below.

Figure 11A:
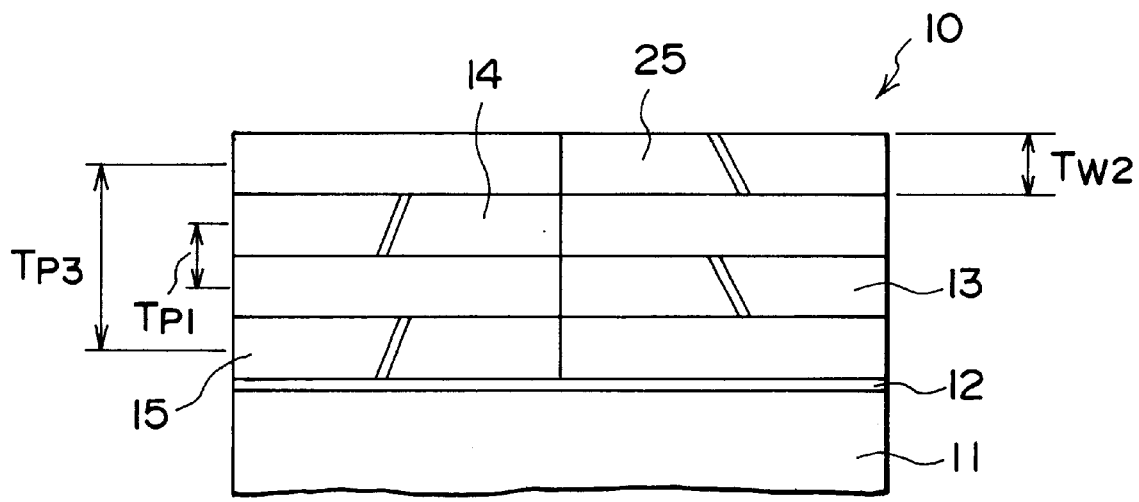
FIGS. 11A and 11B are views explaining the track width on the side of a head and the servo-signal writing state on the side of a magnetic disk in the fifth preferred embodiment of a magnetic disk unit according to the present invention.
Figure 11B:
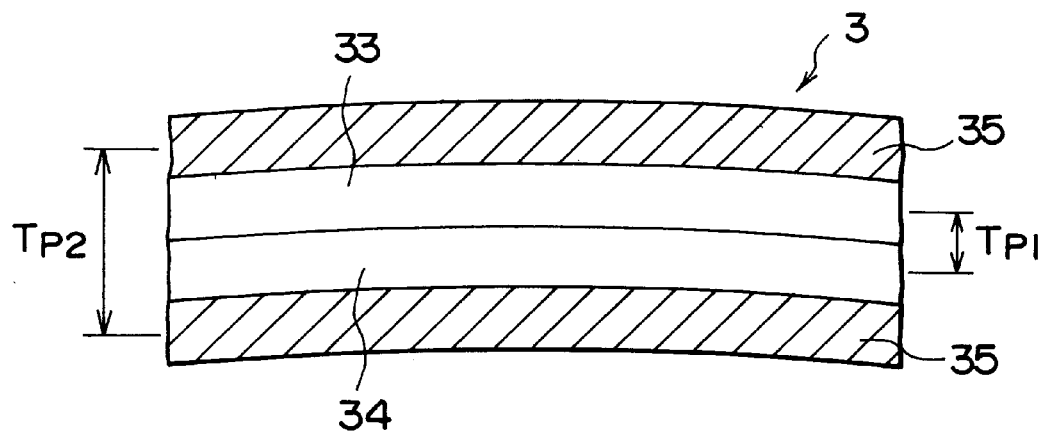

First, referring to FIGS. 11A and 11B, the fifth preferred embodiment of a magnetic disk unit according to the present invention will be described. As shown in FIGS. 11A and 11B, heads 13, 14, 15 and 25 and tracks 33, 34, 35 and 36 are formed on the facing surfaces of a magnetic head portion 10 and a magnetic disk 3, respectively. That is, positional signals are previously recorded on the positioning-signal recording tracks 35 expressed by slanting lines in FIG. 11B, over the whole periphery of the disk. In addition, information recording tracks 33 and 34 are formed so as to be capable of writing and/or reading the information to be recorded.

The track pitch TP1 of the information recording tracks 33 and 34 shown in FIG. 11B is designed to be the same as the pitch TP1 of the heads 13 and 14 shown in FIG. 11A. In addition, the track pitch TP2 of the positioning-signal recording tracks 35 shown in FIG. 11B is designed so that the relationship with respect to the pitch TP3 of the heads 15 and 25 and the width TW2 of the head shown in FIG. 11A is expressed by "TP2=TP3+½×TW2".

With this construction, in a case where the positioning-signal reading heads 15 and 25 read the positioning signals recorded on the two tracks 35, each of the heads 15 and 25 reads a positioning signal having a strength slightly shifted from the signal peak, so that it is possible to detect the position shift of the magnetic head portion from the track on the basis of the detected signal strength to correct the position shift.

In the aforementioned fifth preferred embodiment, two heads for recording the information and two heads for reading the positioning signals have been formed, and a track group of four tracks comprising two information recording tracks and two positioning-signal recording tracks has been formed on the corresponding information recording surface so that the write and/or read is carried out while positioning the heads and the tracks for each of the groups. However, the present invention should not be limited thereto, but various combinations with respect to the numbers of the heads and tracks may be used as long as the number of the heads is the same as that of the tracks. For example, if six, seven or eight heads are used, it is possible to obtain the same advantageous effects as those of the first through fifth preferred embodiments of a magnetic disk unit according to the present invention.

Figure 12A:
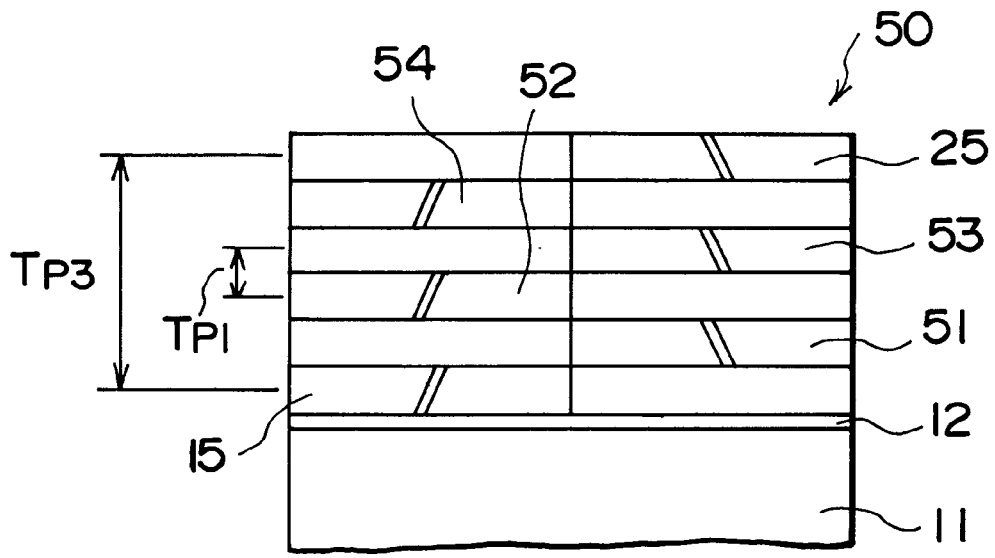
FIGS. 12A and 12B are views explaining the track width on the side of a head and the servo-signal writing state on the side of a magnetic disk in the sixth preferred embodiment of a magnetic disk unit according to the present invention.
Figure 12B:
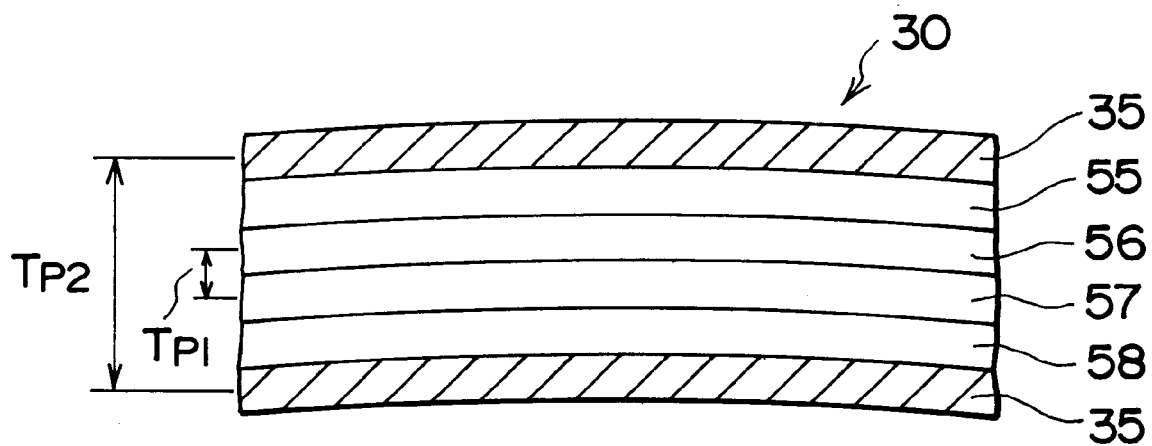

FIGS. 12A and 12B show a magnetic head portion 50 and a magnetic disk 30 corresponding thereto in the sixth preferred embodiment of a magnetic disk unit according to the present invention, wherein four heads for writing and/or reading information and two heads for reading positioning signals are provided. As shown in FIG. 12A, the magnetic head portion 50 comprises positioning-signal reading heads 15 and 25 formed on both sides of a plurality of laminated heads, and information-signal writing and/or reading heads 51, 52, 53 and 54 formed between the heads 15 and 25 so that the inclined angles for azimuth angles are alternately formed. The pitch of the two information-signal writing and/or reading heads 52 and 53 is expressed by TP1, and the pitch of the positioning-signal reading heads 15 and 25 is expressed by TP2.

In addition, as shown in FIG. 12B, the magnetic disk 30 comprises information-signal recording tracks 55, 56, 57 and 58, and positioning-signal recording tracks 35. The pitch of the information-signal recording tracks 56 and 57 corresponding to the heads 52 and 53 is expressed by TP1, and the pitch of the positioning-signal recording tracks 35 is expressed by TP2. In FIGS. 12A and 12B, the respective pitches corresponding to each other are designed to be the same length.

While four information recording tracks have been used in the sixth preferred embodiment, the numbers of the information recording tracks and the writing and/or reading heads corresponding thereto may be greater than four. Although the number of tracks formed as a group can be increased to a relatively large number, the number of laminated heads are limited to a certain number.

Figure 13A:
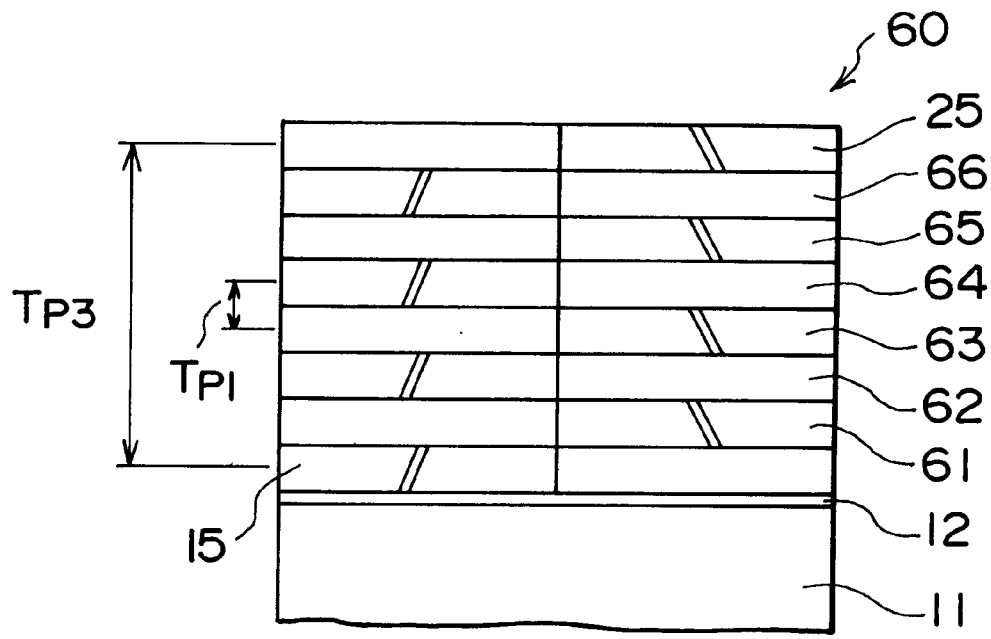
FIGS. 13A and 13B are views explaining the track width on the side of a head and the servo-signal writing state on the side of a magnetic disk in the seventh preferred embodiment of a magnetic disk unit according to the present invention.
Figure 13B:
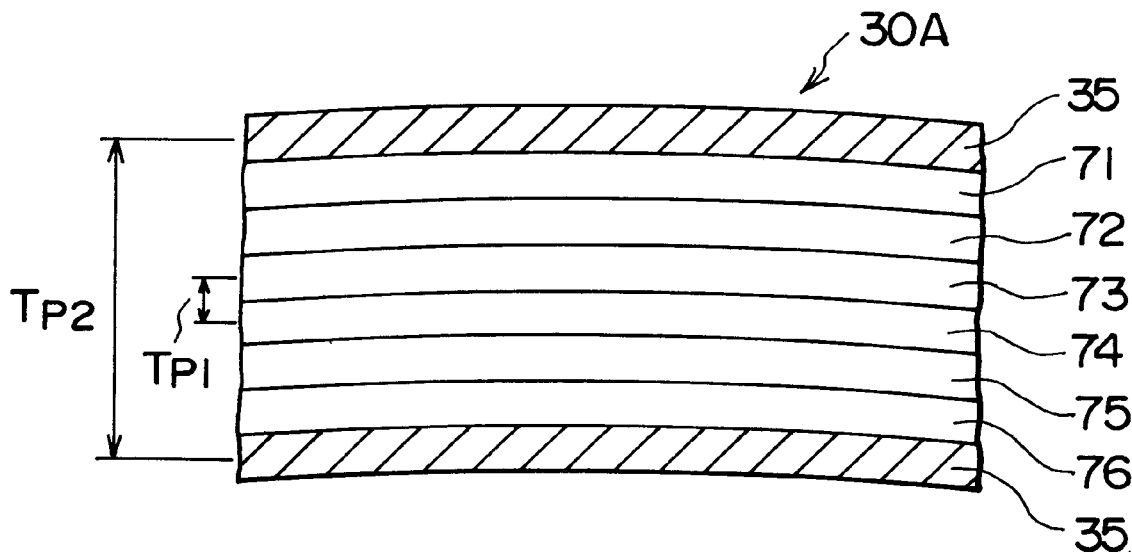

FIGS. 13A and 13B show a magnetic head portion 60 and a magnetic disk 30A in the seventh preferred embodiment of a magnetic disk unit according to the present invention, wherein six information recording tracks and two positioning-signal reading tracks, i.e., eight tracks, are formed as a group. As shown in FIG. 13A, the magnetic head portion 60 comprises positioning-signal reading heads 15 and 25 formed on both sides of a plurality of laminated heads, and information-signal writing and/or reading heads 61, 62, 63, 64, 65 and 66 formed between the heads 15 and 25 so that the inclined angles for azimuth angles are alternately formed. The pitch of the two information-signal writing and/or reading heads 63 and 64 is expressed by TP1, and the pitch of the positioning-signal reading heads 15 and 25 is expressed by TP3.

In addition, as shown in FIG. 13B, the magnetic disk 30A comprises information-signal recording tracks 71, 72, 73, 74, 75 and 76, and positioning-signal recording tracks 35. The pitch of the information-signal recording tracks 73 and 74 corresponding to the heads 63 and 64 is expressed by TP1, and the pitch of the positioning-signal recording tracks 35 is expressed by TP2. In FIGS. 13A and 13B, the respective pitches corresponding to each other are designed to be the same length.

Furthermore, in the fifth through seventh preferred embodiments of a magnetic disk unit according to the present invention, the positioning-signal reading heads 15 and 25 have been provided nearest the substrate 11 and farthest therefrom, and the plurality of information-signal writing and/or reading heads have been provided between the heads 15 and 25. However, the present invention should not be limited thereto, but it is. not required to provide them on both sides of the magnetic head portion as long as two positioning-signal reading heads are provided at an interval.

Figure 14A:
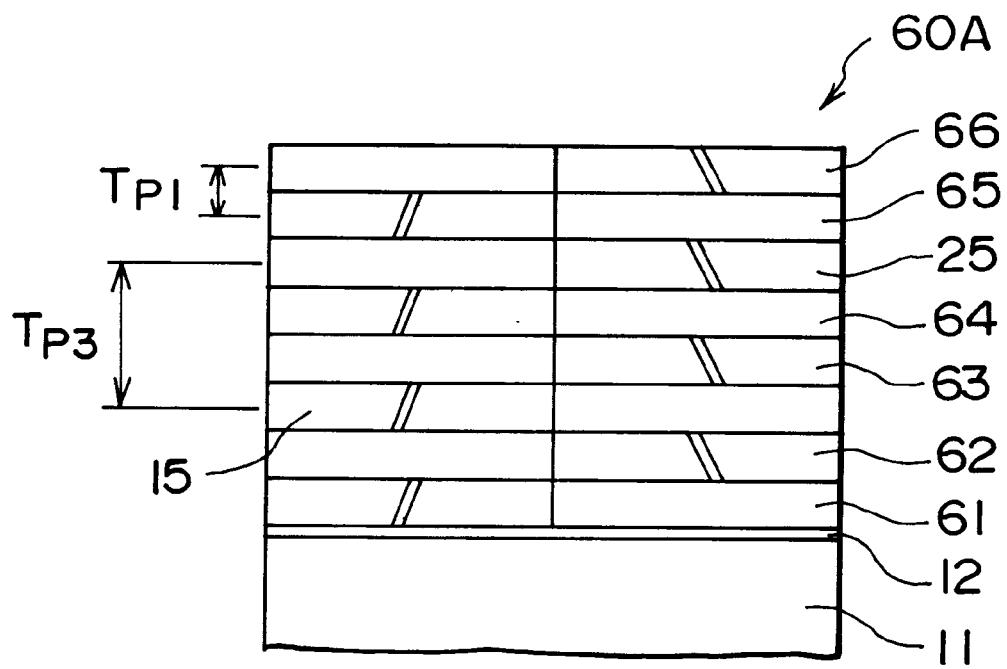
FIGS. 14A and 14B are views explaining the track width on the side of a head and the servo-signal writing state on the side of a magnetic disk in the eighth preferred embodiment of a magnetic disk unit according to the present invention.
Figure 14B:
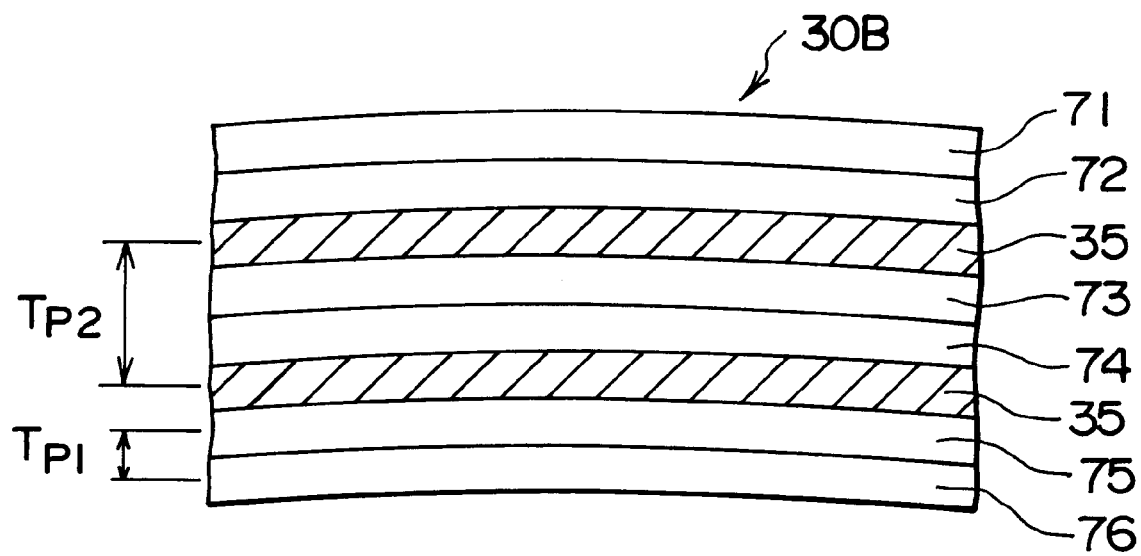

FIGS. 14A and 14B show a magnetic head portion 60A and a magnetic disk 30B in the eighth preferred embodiment of a magnetic disk unit according to the present invention, wherein positioning-signal reading heads 15 and 25 are provided near the center of a group of tracks. As shown in FIG. 14A, the magnetic head portion 60A has information-signal writing and/or reading heads which are provided as pairs of heads 61 and 62, 63 and 64, and 65 and 66, and positioning-signal reading heads 35 which are provided between the respective pairs of heads.

FIG. 14B shows the arrangement of the tracks on the magnetic disk 30B corresponding to the magnetic head portion 60A. Information recording tracks 71 through 76 corresponding to the information-signal writing and/or reading heads 61 through 66 are provided as shown in FIG. 14B. The positioning-signal recording tracks 35 are provided between the information recording tracks 72 and 73 and between the information recording tracks 74 and 75.

Thus, two positional-signal reading heads formed as a group and two tracks corresponding thereto may be arranged at any portions.

While the numbers of the laminated heads and the tracks corresponding thereto have been even in the aforementioned fifth through eighth preferred embodiments, the present invention should not be limited thereto, but the number of the information-signal writing and/or reading heads may be odd while the number of the positioning-signal reading heads must be two.

Figure 15A:
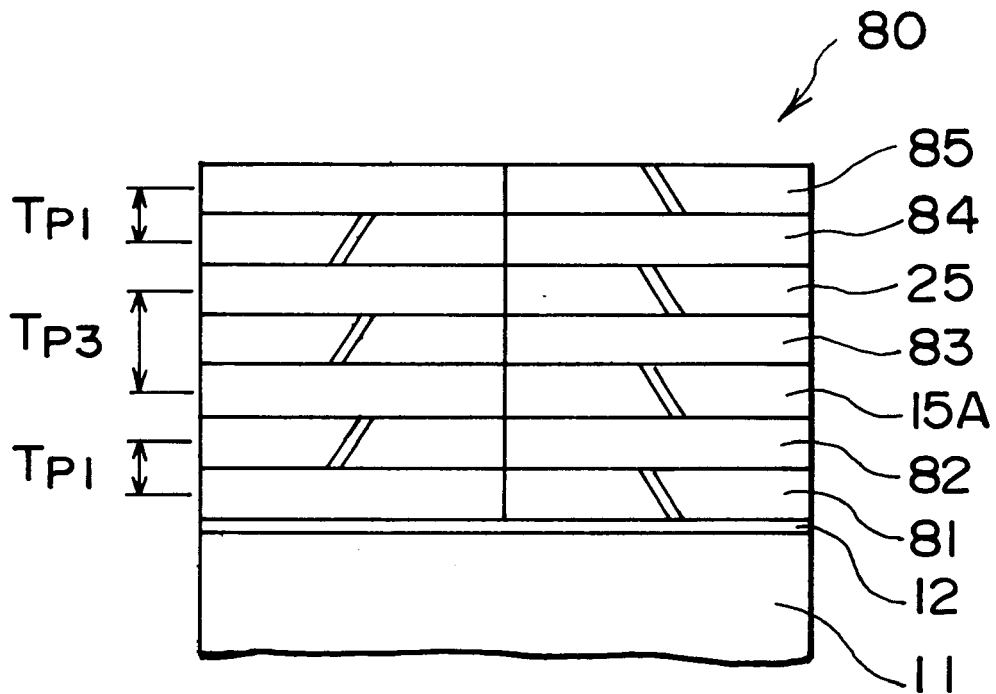
FIGS. 15A and 15B are views explaining the track width on the side of a head and the servo-signal writing state on the side of a magnetic disk in the ninth preferred embodiment of a magnetic disk unit according to the present invention.
Figure 15B:
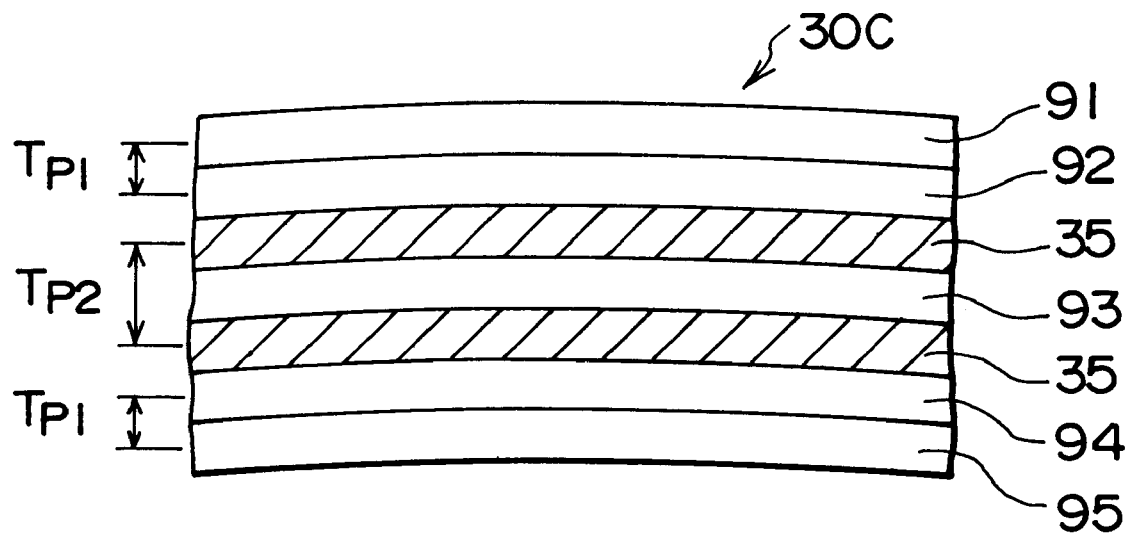

FIGS. 15A and 15B show a magnetic head portion 80 and a magnetic disk 30C in the ninth preferred embodiment of a magnetic disk unit according to the present invention, wherein the numbers of information recording heads and tracks are odd and wherein positioning-signal reading heads 15A and 25 and positioning-signal recording tracks 35 corresponding thereto are provided near the center of a group of tracks. As shown in FIG. 15A, information-signal writing and/or reading heads 81 and 82, and 84 and 85 are formed on both sides of the magnetic head portion 80 at pitch TP1, respectively, and the positioning-signal reading heads 15A and 25 are arranged at pitch TP3 via the remainming information-signal head 83.

In addition, as shown in FIG. 15B, tracks 91 and 92, and 94 and 95 are formed at pitch TP1, and the positioning-signal recording tracks 35 are formed near the center of the group of tracks via an information-signal recording track 93.

In this ninth preferred embodiment, the azimuth angle of the information-signal head arranged at the outermost is formed so as to be an acute angle on the side of the trailing edge and on the far side from the substrate. In addition, one of the positioning-signal reading heads is a head 15A which has an inclined direction different from that in the previous preferred embodiments.

While the azimuth angles of the adjacent heads have been alternately arranged and the positions of the adjacent magnetic yokes have been completely shifted in the aforementioned fifth through ninth preferred embodiments, the present invention should not be limited thereto.

Figure 16:
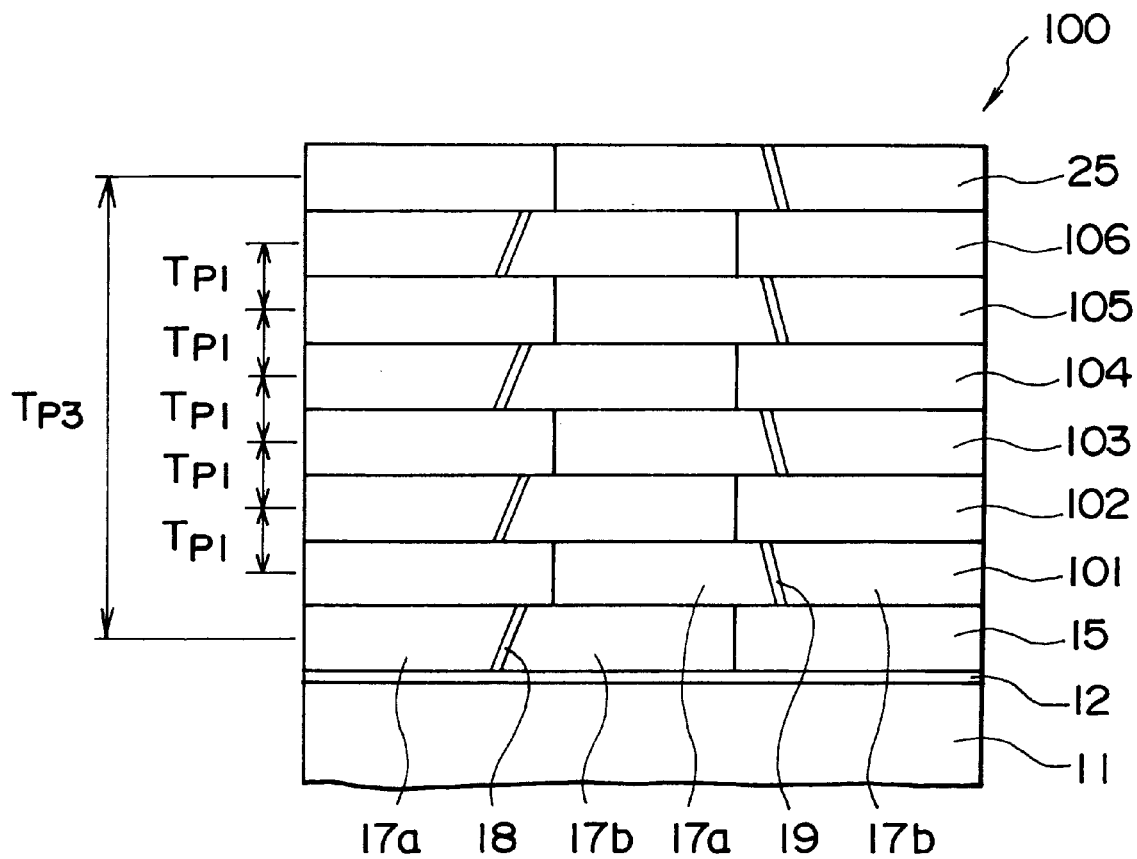
FIG. 16 is a view explaining the track width on the side of a head in the tenth preferred embodiment of a magnetic disk unit according to the present invention.

For example, as a magnetic head portion 100 in the tenth preferred embodiment shown in FIG. 16, the adjacent magnetic yokes 17a and 17b may be overlapped unless the magnetic yoke 17b is overlapped with a magnetic gap 19 or unless the magnetic yoke 17a is overlapped with a magnetic gap 18.

In the magnetic head portion 100 in the tenth preferred embodiment of a magnetic disk unit according to the present invention, the positioning-signal reading heads 15 and 25 are arranged on both sides of the head portion 100 at an interval of pitch TP3, and information-signal writing and/or reading heads 101, 102, 103, 104, 105 and 106 are provided between the heads 15 and 25 at intervals of pitch TP1.

Furthermore, similar to the previous preferred embodiments, the tracks on the magnetic disk corresponding to the magnetic head portion 100 are also formed as a group at locations corresponding to the respective heads, although the tracks are not shown.

While the two positioning-signal reading heads 15 and 25 have been provided with respect to the two positioning-signal recording tracks 35 in any one of the aforementioned fifth through tenth preferred embodiments, the present invention should not be limited thereto, but a single positioning-signal reading head may read a positioning signal.

Figure 17A:
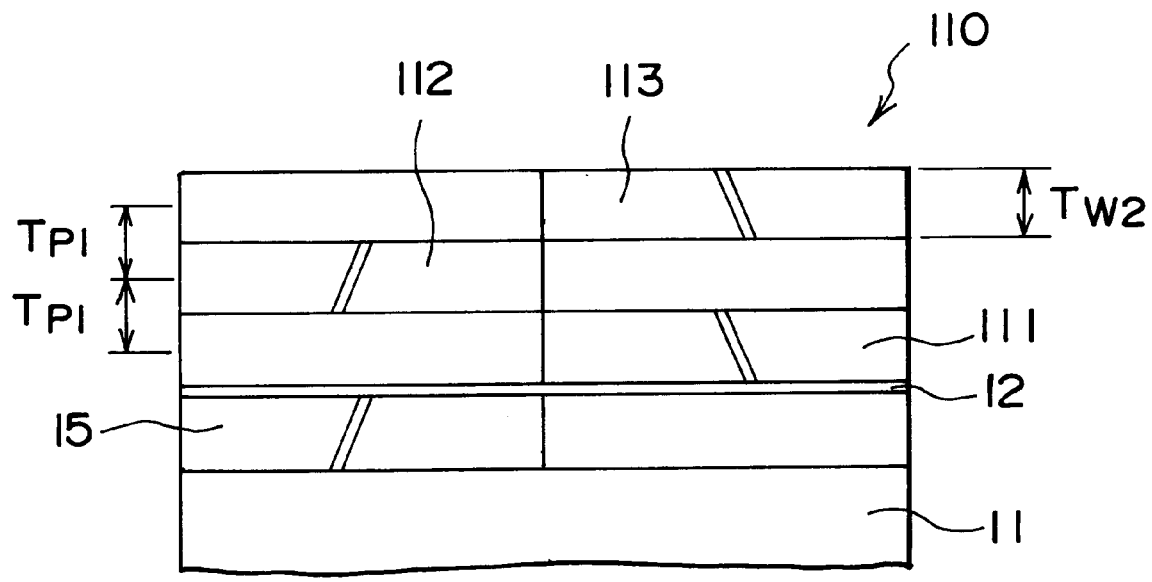
FIGS. 17A and 17B are views explaining the track width on the side of a head and the servo-signal writing state on the side of a magnetic disk in the eleventh preferred embodiment of a magnetic disk unit according to the present invention.
Figure 17B:
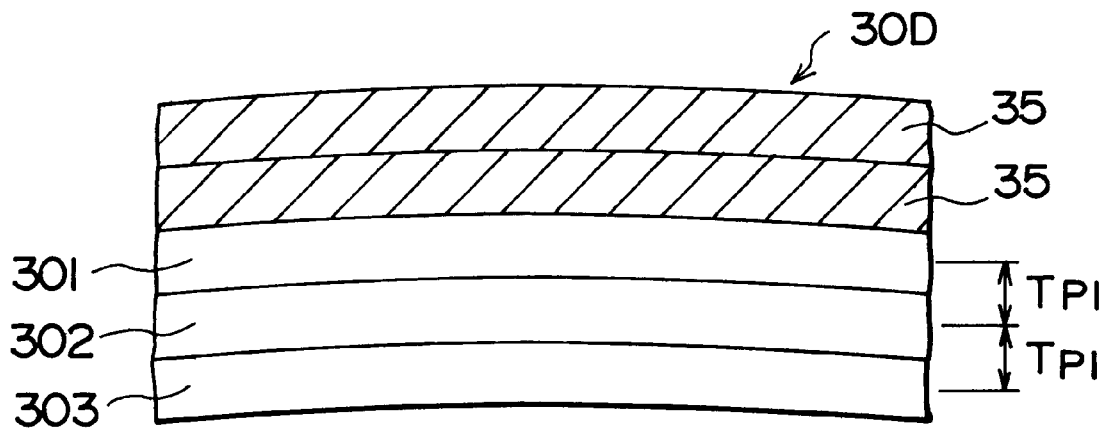

FIGS. 17A and 17B show a magnetic head portion 110 and a magnetic disk 30D in the eleventh preferred embodiment of a magnetic disk unit according to the present invention, wherein a single positioning-signal reading head is used. As shown in FIG. 17A illustrating the magnetic head portion 110 viewed from the bottom of the slider, the magnetic head portion 110 comprises a positioning-signal reading head 15 formed on a substrate 11, and three information-signal writing and/or reading heads 111, 112 and 113 sequentially laminated so as to be formed at pitch TP1 via an insulating film 12 formed on the head 15.

As shown in FIG. 17B, on the signal recording magnetic disk 30D, two positioning-signal recording tracks 35 are formed at locations corresponding to the positioning-signal reading head 15, and three information recording tracks 301, 302 and 303 are formed at pitch TP1 at locations corresponding to the information-signal writing and/or reading heads 111, 112 and 113.

Furthermore, the insulating film 12 is provided between the positioning-signal reading head 15 and the information-signal writing and/or reading head 111, so that the positioning-signal reading head 15 faces both of the two positioning-signal recording tracks 35 to read the positioning signals recorded on both of the tracks.

Figure 18:
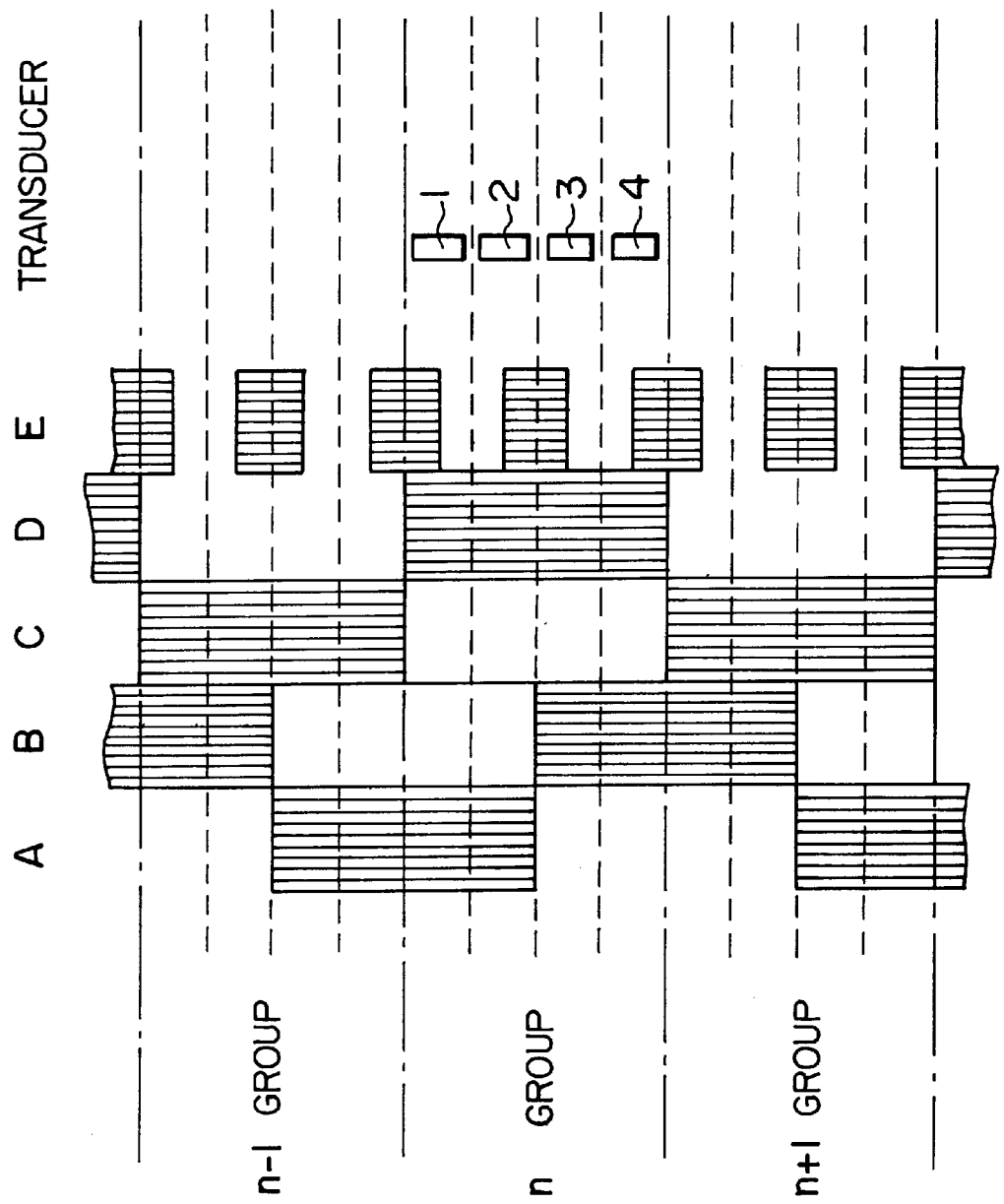
FIG. 18 is a view explaining the servo information patterns of a head in the twelfth preferred embodiment of a magnetic disk unit according to the present invention.
Figure 19:
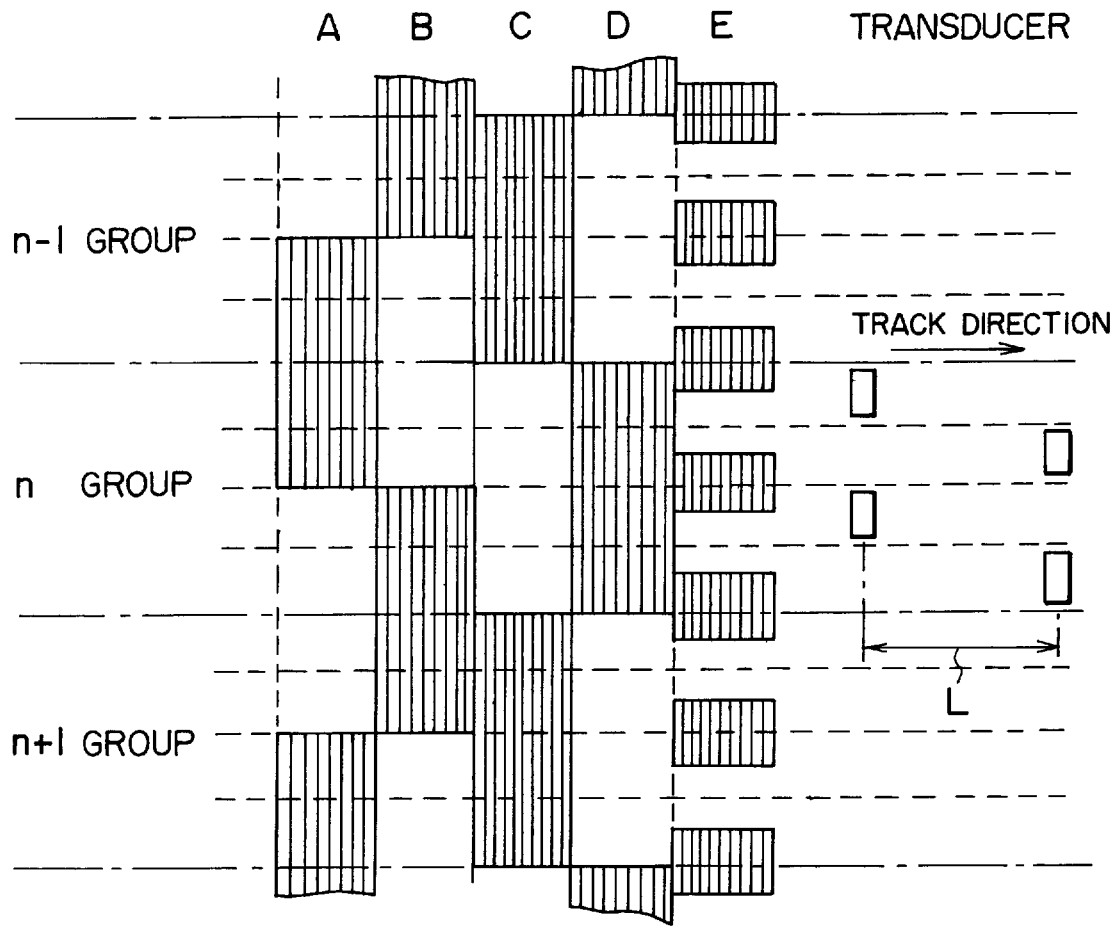
FIG. 19 is a view explaining another example of the arrangement of a transducer of a head in the twelfth preferred embodiment of a magnetic disk unit according to the present invention.
Figure 20:
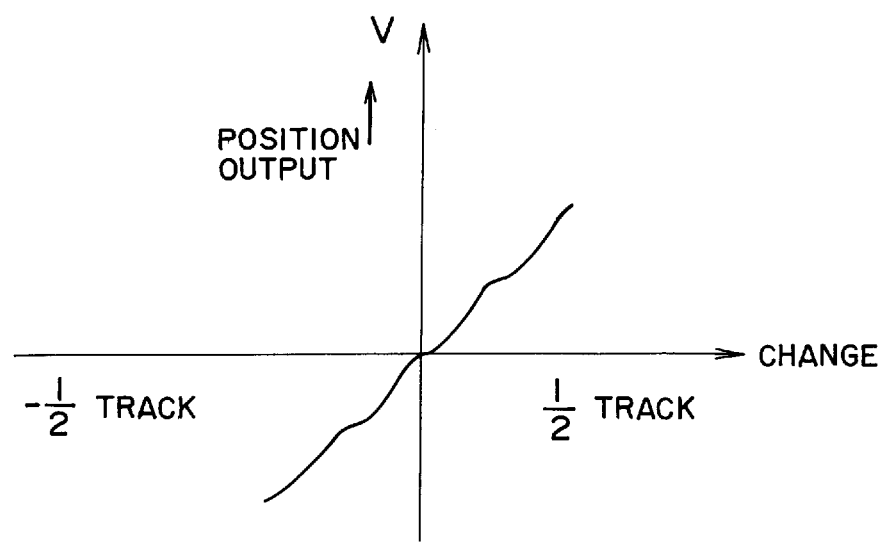
FIG. 20 is a graph of characteristic curve obtained when a magnetic head traverses a group of tracks in the twelfth preferred embodiment according to the present invention.
Figure 21:
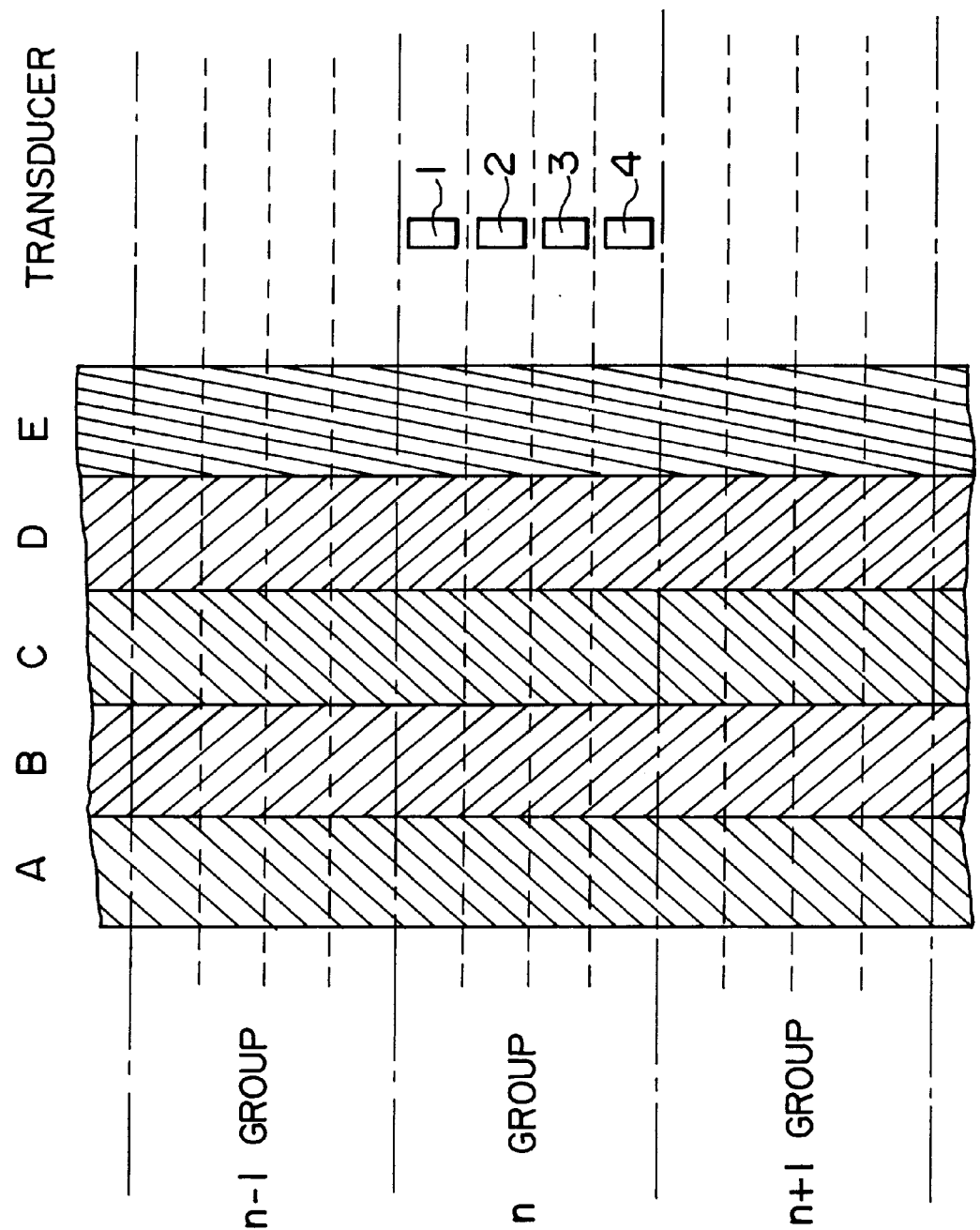
FIG. 21 is a view explaining that read signals expressed by phases are expressed by amplitudes in the twelfth preferred embodiment.

Referring to FIGS. 18 through 20, the twelfth preferred embodiment of a method for reading a recorded information out of a high-density magnetic disk by means of a magnetic multi-head unit with the aforementioned construction, according to the present invention, will be described below. In the figures, plurality of heads are represented as a plurality of transducers. Accordingly, a magnetic multi-head has four transducers as shown in FIGS. 18, 19 and 21.

When data are recorded by the magnetic multi-head having the above configuration, there are two features, in which the azimuth angles of signals on two adjacent tracks are different from each other, and the yaw angles of the outermost and innermost tracks of the same access are different from each other because a plurality of heads are stacked one by one and each track width is narrow. By two features, it is desirable to use the same head when recording and reproducing data. For example, when the data are reproduced by the head adjacent to other head which is used at recording data, the conventional multi-head has no problem because the yaw angles are substantially the same from the same azimuth angle. However, since the multi-head of the present invention has the different azimuth angles, a loss occurs in the read signal. Accordingly, it is desirable that the read head is the same as the recording head.

FIG. 18 shows signal amplitudes of magnetic information representative of positional information on a magnetic multi-head having four transducers 1, 2, 3 and 4, according to the present invention. In FIG. 18, the transducers are in alignment with each other. However, in a case where the transducers are arranged so as to be staggered as shown in FIG. 19, if the outputs of a group of transducers are delayed in accordance with the rotational speed of the disk, it is possible to obtain the same function as that in FIG. 18. Assuming that the distance between the front and rear transducers is L and that the peripheral speed of the disk at the position of the disk is U, it is possible to obtain the same function as when the transducers are in alignment with each other, only for a period of time "t=L/U" by delaying the outputs of the front group of transducers.

In this preferred embodiment, tracks passing through four transducers form one group of tracks, and groups of tracks (n−1), n and (n+1) are shown. As the positional information, servo patterns A, B, C, D and E are shown. The patterns A, B, C and D are shown in a cycle of two groups of tracks in accordance with the groups of tracks. The servo patterns A and B (C and D) are written so as to shift from each other by a group of tracks, and the servo pattern A and C (B and D) are written so as to shift from each other by a half group of tracks. The servo pattern E is written in a cycle of two tracks.

When seeking, the sum of m outputs of all the transducers of the servo patterns A, B, C and D is obtained as a single head output to carry out the seek action. Since each of the transducers has a dead band corresponding to a guard band, the relationship between the head position obtained by the servo patterns A, B, C and D and the positional information output is non-linear, but substantially linear. In this case, the seek can be carried out every four tracks. The relationship between the position 5 output and the head position is shown in FIG. 20. When the head position is the position of track group k/4, a small sensitivity occurs. When the head position approximates zero, servo information E is used for obtaining an accurate servo information. By subtracting the sum of the outputs of the odd numbers of transducers from the sum of the outputs of the even numbers of transducers, an average positional error information of all the transducers can be obtained in the range of from −½ to ½. In this information, the noise is $1/\sqrt{4}$ times as large as the signal, so that S/N is improved by 6 dB in comparison with that of a single transducer. If a positioning servo system is formed using this signal, it is possible to accurately carry out the head positioning.

The servo pattern E is written so as to shift from the servo patterns A, B, C and D by a half track. In this case, the circuit is most simple. However, it may be electrically offset when positioning without shifting by a half track. In this case, the servo write is quickly and simply carried out. Therefore, in this twelfth preferred embodiment, it is possible to provide a magnetic disk unit which can increase the data transfer rate and which does not lower the positioning accuracy even if the track density increases.

While the positional information has been expressed by the signal amplitude as shown in FIG. 18 in the aforementioned twelfth preferred embodiment, the phase may be used as shown in FIG. 21 when the positional information is read out of the four tracks by means of the four heads.

Figure 22A:
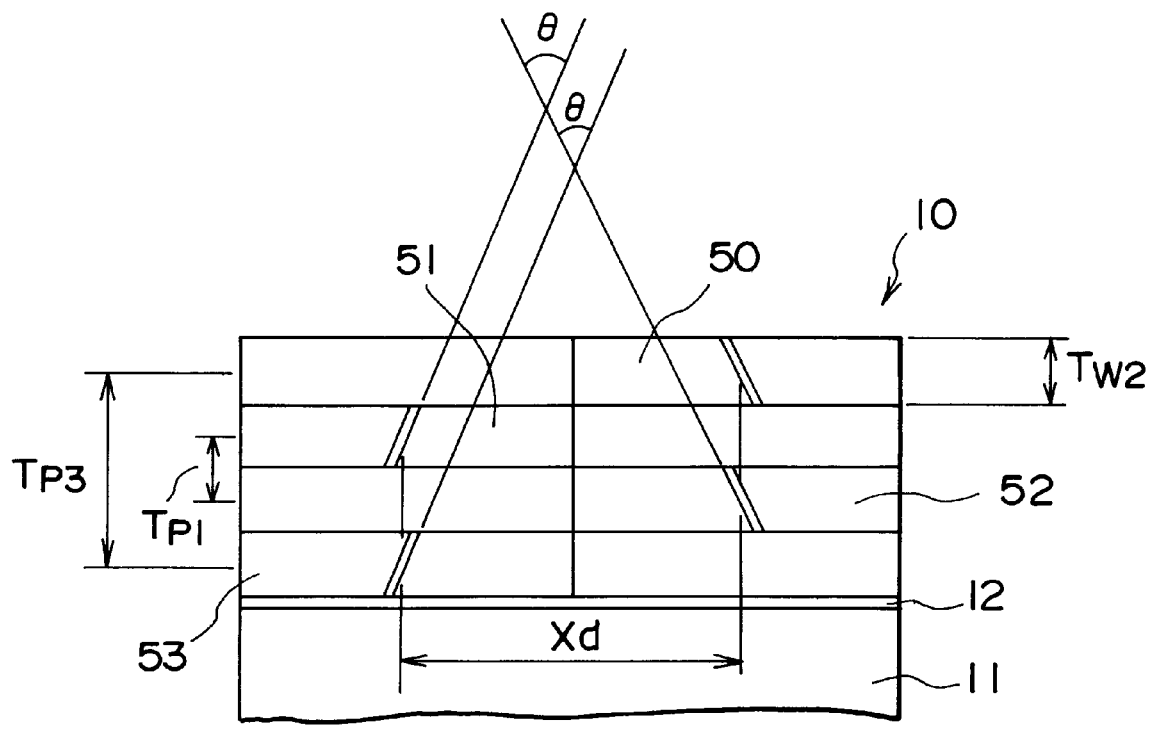
FIGS. 22A and 22B are views explaining the relationship between the arrangement of a head and tracks in the thirteenth preferred embodiment of a magnetic disk unit according to the present invention.
Figure 22B:
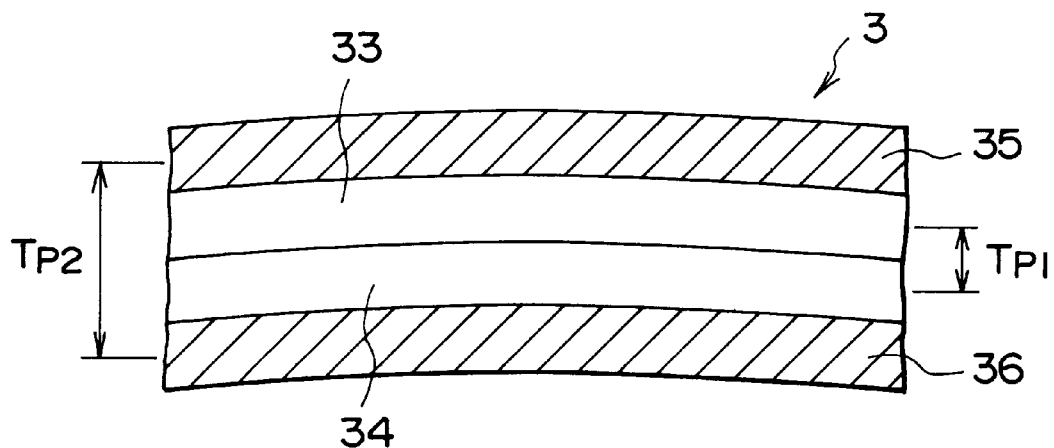
Figure 23:
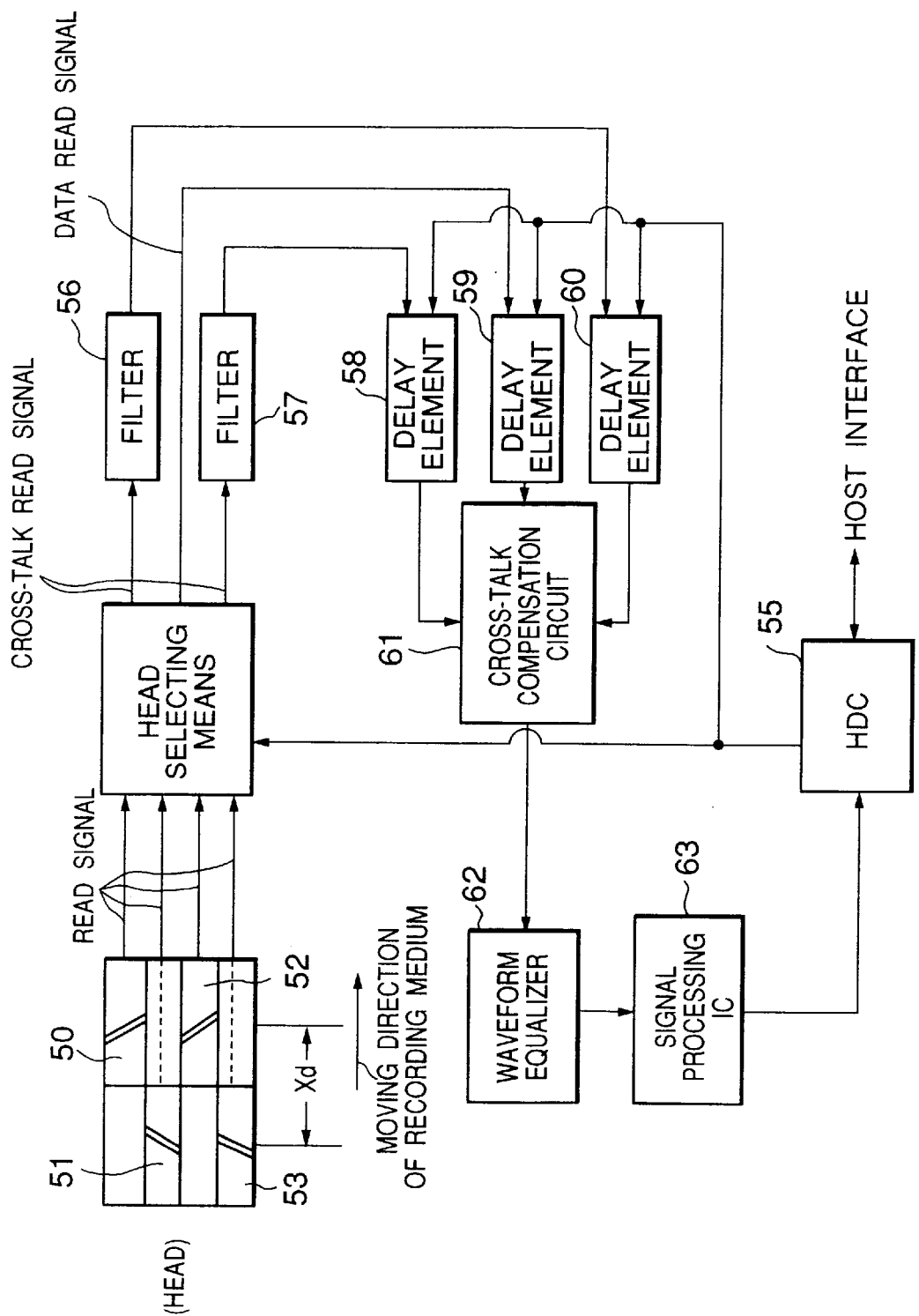
FIG. 23 is a block diagram of the thirteenth preferred embodiment of a magnetic disk unit according to the present invention.

Referring to FIGS. 22A, 22B and 23, the thirteenth preferred embodiment of a magnetic disk unit having a multi-head unit, according to the present invention, will be described below.

FIG. 22A shows a lamination-stacked head structure wherein four magnetic heads shown in FIG. 22B can be arranged on the adjacent four recording tracks. The four magnetic heads 50, 51, 52 and 53 are formed so as to have an azimuth angle θ with respect to the adjacent read elements. In this thirteenth preferred embodiment, the azimuth angle θ is set to be "θ=45°". The track width is Tw2=1 μm, and the track pitch is Tp1=1 μm. The four magnetic head 50, 51, 52 and 53 have the same laminated structure as the head structure shown in FIG. 2, and each of the heads has a common magnetic yoke for recording and/or reproducing. The magnetic heads 50 and 52 are arranged so as to shift from the magnetic heads 51 and 53 by Xd in a longitudinal direction of the track. In this thirteenth preferred embodiment, the value of the position shift is, e.g., "Xd=20" μm, and the relative speed v between the head disk media is, e.g., 10 m/s.

FIG. 23 is a block diagram illustrating a read channel structure for decoding while compensating the cross talk using a read signal outputted from the group of magnetic heads shown in FIG. 22. The read signal outputted from the group of magnetic heads is inputted to head selecting means 54 containing a read amplifier. On the basis of a command from a hard disk controller (hereinafter referred to as a "HDC"), the head selecting means 54 selects a data reproducing head and cross-talk compensation reproducing heads adjacent thereto on both sides thereof, from the group of heads 50, 51, 52 and 53. For example, the head selecting means 54 selects the magnetic head 52 as the data reproducing head, and the adjacent magnetic heads 51 and 53 on both sides as the cross-talk compensation reproducing heads. The read signals from the heads selected by the head selecting means are divided into two types of read signals, i.e., into a data read signal and cross-talk read signals. The cross-talk read signals are inputted to filters 56 and 57 for adjusting the amplitudes thereof by simulating the cross-talk transfer function which greatly attenuates short-wavelength components. There is a time difference between the data read signal and the cross-talk read signal due to the position shift Xd in a longitudinal direction of the track between the magnetic head 52 selected as the data reproducing head and the magnetic heads 51 and 53 selected as the cross-talk reproducing heads.

Therefore, assuming that the moving direction of the recording medium is a direction from left to right in the drawing and that the relative speed between the head and the medium is v, the cross-talk read signals are quickly reproduced by the time Xd/v in comparison with the data read signal. That is, the time difference is Xd/v. In the aforementioned example, the time difference is 1 msec. In order to compensate this time difference to subtract only the cross talk from the data read signal, the cross-talk read signals are inputted to delay elements 58 and 60 to delay the signals by the value Xd/v commanded by the HDC to output the delayed signals. In a case where the data read signal is quickly reproduced by selecting the head, the data read signal is delayed by means of the delay element 59. Thus, in order to compensate the time shift, the read signals are suitably delayed by means of the delay element selected by the HDC so that the cross talk component has the same phase in accordance with the selection of the head, and then, the delayed read signals are inputted to a cross-talk compensating circuit 61. The cross-talk compensating circuit 61 subtracts the cross-talk read signal from the data read signal. The signal compensated by subtracting the cross-talk component is inputted to a wave-form equalizer 62. The waveform equalized signal is decoded by a signal processing IC 63 to be outputted to a host interface as a read data row.

Such a cross-talk compensating processing can be also applied to a multi-head structure wherein many heads are laminated as shown in FIG. 13A. In addition, if the position shift Xd between the adjacent magnetic heads in a direction of track is different every magnetic head, it is possible to compensate the cross talk similar to the preferred embodiment shown in FIG. 13, by causing the HDC to command the delayed amount corresponding to the selected heads.

According to the present invention, it is possible to provide a magnetic disk unit, which can accomplish a high-density track and wherein the deterioration of data quality due to the cross talk and so forth is small and the reliability of data is high, because it is possible to decrease a cross talk by changing the azimuth angles between two adjacent tracks, and to compensate the cross talk by a signal processing.

What is claimed is:

1. A magnetic multi-head unit comprising:
   a specific magnetic head formed so that a pair of magnetic yokes face each other on the same plane via a magnetic gap inclined by a first azimuth angle; and
   a magnetic head, adjacent to said specific magnetic head, formed so that a pair of magnetic yokes face each other on a plane different from said plane of said specific magnetic head via a magnetic gap inclined by a second azimuth angle;
   wherein said specific magnetic head and said adjacent magnetic head are laminated so as to form a plurality of layers while being shifted from each other in directions in which tracks on a magnetic disk extend.

2. A magnetic multi-head unit as set forth in claim 1, wherein the first azimuth angle of said specific magnetic head is different from the second azimuth angle of said adjacent magnetic head.

3. A magnetic multi-head unit as set forth in claim 1, wherein said specific magnetic head and said adjacent magnetic head have magnetic gaps inclined by the first and second azimuth angles, respectively, and wherein each of magnetic yokes forming said magnetic heads is also inclined at a predetermined angle in a depth direction of the magnetic yoke from said magnetic gap, said predetermined angle being an acute angle at least on the side of a trailing edge.

4. A magnetic multi-head unit as set forth in claim 1, which further comprises a magneto-resistance element arranged between said specific magnetic head and said adjacent magnetic head, said magneto-resistance element extending over the magnetic gap of said specific magnetic head.

5. A magnetic multi-head unit as set forth in claim 4, wherein said magneto-resistance element comprises: insulating films arranged between the element and magnetic substances forming the magnetic yokes of said heads; magneto-resistance films which are insulated from said magnetic yokes by means of said insulating films and which extend over said magnetic gaps; and a pair of leads which are formed on said magneto-resistance films so as to be substantially parallel to a magnetic circuit formed by said magnetic yokes and which electrically connect said magneto-resistance films so that a sense current flows in a longitudinal direction of said magneto-resistance films.

6. A magnetic disk unit comprising:
   a magnetic disk including positioning-signal recording tracks wherein positioning signals are recorded on any two tracks out of tracks of each group which includes a plurality of tracks formed as concentric circulars on at least one surface of the disk, and information recording tracks which are formed by tracks of the remaining groups for recording information signals; and
   a magnetic multi-head unit including a plurality of information-signal recording and/or reproducing heads, the number of which is the same as that of said information recording tracks and which are arranged at locations corresponding to said information recording tracks, and positioning-signal reading heads which are arranged at locations corresponding to said two positioning-signal recording tracks, wherein two heads of said plurality of heads, which are adjacent to each other in lateral directions of the tracks, are shifted in directions in which said tracks extend, and wherein azimuth angles of said adjacent two heads are different from each other.

7. A magnetic disk unit as set forth in claim 6, wherein each head of said magnetic head portion has a pair of magnetic yokes facing each other via a magnetic gap, and wherein said magnetic yokes have said first and second azimuth angles and are also inclined by a predetermined angle in depth directions of said magnetic yokes, said predetermined angle being an acute angle at least on the side of a trailing edge.

8. A magnetic disk unit as set forth in claim 6, wherein said magnetic multi-head unit is formed by laminating said plurality of heads and mounting the heads on a slider mounted on a supporting arm, and wherein said azimuth angle of at least an outermost head is an acute angle outside of magnetic yokes on a side of a trailing edge.

9. A magnetic disk unit as set forth in claim 6, wherein each of said plurality of recording and/or reproducing heads of said magnetic multi-head unit comprises said magnetic yokes facing each other via said magnetic gap having said azimuth angle, and magneto-resistance elements which are laminated so as to extend over said magnetic gap between the adjacent heads and which are used for reading a signal recorded on said magnetic recording medium.

10. A magnetic disk unit as set forth in claim 9, wherein said magneto-resistance element comprises: insulating films arranged between the element and magnetic substances forming the magnetic yokes of said heads; magneto-resistance films which are insulated from said magnetic yokes by means of said insulating films and which extend over said magnetic gaps; and a pair of leads which are formed on said magneto-resistance films so as to be substantially parallel to a magnetic circuit formed by said magnetic yokes and which electrically connect said magneto-resistance films so that a sense current flows in a longitudinal direction of said magneto-resistance films.

11. A magnetic disk unit comprising:

a magnetic disk, on which a plurality of information recording tracks are formed so as to extend in peripheral directions and which is rotated; and a magnetic multi-head including a plurality of heads for writing and/or reading magnetic information on said plurality of information recording tracks of said magnetic disk at a unit of a predetermined group of said tracks;

wherein said plurality of heads are positioned as one with respect to said predetermined group of said tracks; and wherein position information outputs which are obtained by said plurality of heads are summed up, to determine positions of said plurality of heads with respect to said unit of the predetermined group of said tracks.

12. A magnetic disk unit comprising:

a magnetic disk, on which a plurality of information recording tracks are formed so as to extend in peripheral directions and which is rotated; and a magnetic multi-head including a plurality of heads for writing and/or reading magnetic information on said plurality of information recording tracks of said magnetic disk at a unit of a predetermined group of said tracks;

wherein said plurality of heads are positioned as one with respect to said predetermined group of said tracks; and wherein two position informations are written on a track of said magnetic disk, said two position informations comprising a first servo information representative of the position of the unit of said group of tracks, through which said plurality of heads formed as one pass, and a second servo information representative of the position of each of said tracks corresponding to each of said heads.

13. A magnetic disk unit as set forth in claim 12, wherein magnetic information of said second servo information representative of the position of each of said tracks corresponding to each of said heads is written every two tracks.

* * * * *